(12) United States Patent
Hashimoto et al.

(10) Patent No.: US 9,134,511 B2
(45) Date of Patent: Sep. 15, 2015

(54) IMAGING LENS

(71) Applicant: KANTATSU CO., LTD., Yaita-shi, Tochigi (JP)

(72) Inventors: Masaya Hashimoto, Sukagawa (JP); Hisao Fukaya, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 16 days.

(21) Appl. No.: 14/146,761

(22) Filed: Jan. 3, 2014

(65) Prior Publication Data

US 2014/0211328 A1  Jul. 31, 2014

(30) Foreign Application Priority Data

Jan. 25, 2013  (JP) .................................. 2013-011847
Feb. 19, 2013  (JP) .................................. 2013-030313

(51) Int. Cl.
*G02B 3/02*  (2006.01)
*G02B 13/18*  (2006.01)
*G02B 13/00*  (2006.01)

(52) U.S. Cl.
CPC .................................. *G02B 13/0045* (2013.01)

(58) Field of Classification Search
CPC ............. G02B 13/18; G02B 9/60; G02B 3/04
USPC ................................................. 359/708, 714
See application file for complete search history.

(56) References Cited

U.S. PATENT DOCUMENTS

| 7,443,610 | B1* | 10/2008 | Lin et al. ........................ 359/714 |
| 8,334,922 | B2* | 12/2012 | Shinohara ...................... 348/340 |
| 8,542,448 | B2* | 9/2013 | Shinohara ...................... 359/714 |
| 2010/0253829 | A1* | 10/2010 | Shinohara ...................... 348/340 |
| 2012/0154929 | A1* | 6/2012 | Tsai et al. ........................ 359/714 |
| 2012/0218647 | A1* | 8/2012 | Yonezawa et al. ............. 359/714 |
| 2013/0113976 | A1* | 5/2013 | Shinohara ................ 348/333.01 |
| 2013/0235463 | A1 | 9/2013 | Chen et al. |
| 2013/0265650 | A1 | 10/2013 | Chen et al. |
| 2013/0321932 | A1 | 12/2013 | Hsu et al. |
| 2014/0029116 | A1 | 1/2014 | Tsai et al. |

FOREIGN PATENT DOCUMENTS

| JP | 2009-75141 A | 4/2009 |
| JP | 2010-26434 A | 2/2010 |
| JP | 2010-271541 A | 12/2010 |
| TW | 201235694 A1 | 9/2012 |

* cited by examiner

*Primary Examiner* — James Greece
(74) *Attorney, Agent, or Firm* — Westerman, Hattori, Daniels & Adrian, LLP

(57) ABSTRACT

A low-cost, compact and low-profile imaging lens with relatively high brightness, which provides a wide angle of view of about 90 degrees and corrects various aberrations properly. It is designed for use in a solid-state image sensor and includes the following elements arranged in order from an object side to an image side: a first lens as a positive or negative double-sided aspheric lens having a convex object-side surface near an optical axis; an aperture stop; a positive second lens having a convex image-side surface; a negative third lens having a concave image-side surface; a positive fourth lens having a convex image-side surface; and a fifth lens as a negative meniscus lens having a concave image-side surface near the optical axis. It satisfies a conditional expression (1) below:

$$0.9 < ih/f < 1.1 \qquad (1)$$

where
f: focal length of the overall optical system of the imaging lens
ih: maximum image height.

20 Claims, 16 Drawing Sheets

IMAGING LENS

The present application is based on and claims priority of Japanese patent application No. 2013-030313 filed on Feb. 19, 2013, and Japanese patent application No. 2013-011847 filed on Jan. 25, 2013, the entire contents of which are hereby incorporated by reference.

BACKGROUND OF THE INVENTION

1. Field of the Invention

The present invention relates to imaging lenses which form an image of an object on a solid-state image sensor such as a CCD sensor or C-MOS sensor used in a compact image pickup device and more particularly to imaging lenses which are built in image pickup devices mounted in increasingly compact and low-profile mobile terminals such as smart phones, mobile phones and PDAs (Personal Digital Assistants), and game consoles and information terminals such as PCs.

2. Description of the Related Art

In recent years, there has been a tendency for image pickup devices mounted in mobile terminals such as smart phones to provide high resolution to cope with an increase in the number of pixels. Also, the imaging lenses built in these image pick-up devices are requested to provide high resolution, compactness, low-profileness (thinness) and high brightness. In addition, wide-angle cameras capable of capturing an image of an object in a wide perspective are expected to be used in a wider range of application fields than before. For example, the use of wide-angle cameras in compact monitoring cameras and security cameras has been spreading and recently robot vacuum cleaners with cameras remotely controllable by smart phones and eyeglass type head-mounted displays with cameras have been developed, rapidly. The imaging lenses of the image pickup devices mounted in these products are strongly expected to provide not only high performance and compactness but also a wider angle of view or wider angle of field than before.

However, if the photographing angle of view is widened, it might cause a problem that correction of aberrations in peripheral areas is very difficult and a desirable optical performance is not ensured. Therefore, it is difficult to realize an imaging lens which meets the needs for high resolution, compactness, and low-profileness and also the demand for a wider angle of view.

The imaging lenses described in the following patent documents 1 to 3 are known as imaging lenses intended to meet the needs for a wider angle of view and higher performance.

JP-A-2009-075141 (Patent Document 1) discloses an imaging lens in which elements are arranged in the following order from an object side: a negative first lens having a concave surface on an image side; a positive second lens having a convex surface on the image side; an aperture stop; a third lens as a plano-convex lens having a flat surface on the object side or a biconvex lens having a surface with a large absolute value of curvature radius on the object side; and a cemented lens with positive composite refractive power, composed of a fourth and a fifth lens.

JP-A-2010-271541 (Patent Document 2) discloses an imaging lens in which lenses are arranged in the following order from an object side to an image side: a first lens as a biconvex lens with positive refractive power; a second lens with negative refractive power having a concave surface on the image side; a third lens as a meniscus lens with positive refractive power having a convex surface on the image side; and a fourth lens as a double-sided aspheric lens with negative refractive power having a concave surface on the image side near an optical axis.

JP-A-2010-026434 (Patent Document 3) discloses an imaging lens intended to be compact and correct various aberrations properly, in which lenses are arranged in the following order from an object side: a positive first lens, a positive second lens, a negative third lens, a positive fourth lens, and a negative fifth lens.

The imaging lens described in Patent Document 1 provides high brightness with an F-value of 2.0 and also offers a wide angle of view of about 90 degrees through its first lens with negative refractive power. However, its total track length is about 18 mm, so it cannot meet the needs for compactness and low-profileness. Furthermore, since all the lens surfaces are spherical, it is difficult to correct aberrations and achieve high imaging performance. The disclosed aberration graphs also indicate that spherical aberrations are significant. Furthermore, since all the lenses are made of glass material, it is hard to reduce cost.

The imaging lens described in Patent Document 2 has a total track length of about 5.4 mm and the ratio of the total track length to the diagonal length of the effective imaging plane of the image sensor is about 0.9. This suggests that the imaging lens is relatively low-profile. Also the maximum angle of view is about in the range from 70 degrees to 75 degrees, so it provides a relatively wide angle of view but it cannot respond to the recent demand for a wider angle of view. In addition, its F-value is about 2.8, so it cannot be said to provide sufficient brightness to cope with a compact, high-pixel image sensor.

The imaging lens described in Patent Document 3 provides high brightness with an F-value of 2.0 to 2.5 or so and has an ability to correct various aberrations properly. Since it is composed of five constituent lenses, it is advantageous in correcting aberrations but disadvantageous in terms of compactness and low-profileness. Its total track length is as long as about 7.8 mm and the ratio of total track length to maximum image height is about 1.1. The maximum angle of view is about 62 degrees. Therefore, the imaging lens described in Patent Document 3 also does not meet all the above recent needs.

As mentioned above, in the related art, it is difficult to provide the required high resolution, compactness and low-profileness and also meet the demand for a wide angle of view.

SUMMARY OF THE INVENTION

The present invention has been made in view of the above problem and an object thereof is to provide a low-cost, compact and low-profile imaging lens with relatively high brightness, which provides a wide angle of view with a maximum angle of view of about 90 degrees and corrects various aberrations properly.

The term "low-profile" here implies that the total track length is shorter than the diagonal length of the effective imaging plane of the image sensor.

According to one aspect of the present invention, there is provided an imaging lens for a solid-state image sensor in which elements are arranged in the following order from an object side to an image side: a first lens as a double-sided aspheric lens with positive or negative refractive power having a convex surface on the object side near an optical axis; an aperture stop; a second lens with positive refractive power having a convex surface on the image side; a third lens with negative refractive power having a concave surface on the image side; a fourth lens with positive refractive power having a convex surface on the image side; and a fifth lens as a meniscus lens with negative refractive power having a concave surface on the image side near the optical axis. The imaging lens satisfies a conditional expression (1) below:

$$0.9 < ih/f < 1.1 \quad (1)$$

where f represents the focal length of the overall optical system of the imaging lens and ih represents the maximum image height.

The above imaging lens is a so-called telephoto lens which includes a lens group with positive composite refractive power, composed of the first lens, the second lens, the third lens, and the fourth lens, and a fifth lens with negative refractive power, so it is advantageous in shortening the total track length.

The first lens has relatively weak positive or negative refractive power and mainly contributes to correcting aberrations properly. In addition, both its surfaces are aspheric and its object-side surface has an aspheric shape which changes from convex in the vicinity of the optical axis to concave in the peripheral portion, so spherical aberrations and astigmatism at a high image height position are corrected effectively. If the first lens has an aspheric shape which uniformly changes unlike the above aspheric shape, it is easy to take in light rays at a wider angle, offering an advantage in providing a wider angle of view.

The second lens is a lens with positive refractive power having a convex surface on the image side and its refractive power is relatively strong among the five constituent lenses. If the second lens is a biconvex lens, the positive refractive power is shared by the object-side surface and image-side surface so as to generate strong refractive power while preventing a rise in the tolerance sensitivity of the surfaces, and makes it advantageous in shortening the total track length. If the second lens is a meniscus lens having a convex surface on the image side, and if the curvature radius of the object-side surface is larger than that of the image-side surface, astigmatism and field curvature are corrected effectively.

The third lens is a lens with negative refractive power having a concave surface on the image side and effectively corrects spherical aberrations and chromatic aberrations.

The fourth lens is a lens with positive refractive power having a convex surface on the image side and mainly corrects astigmatism and field curvature.

The fifth lens is a meniscus lens with negative refractive power having a concave surface on the image side and easily ensures an adequate back focus. Since its object-side surface and image-side surface have an aspheric shape with pole-change points, it mainly corrects distortion and field curvature and controls the angle of light rays incident on the image sensor. Here, a "pole-change point" means a point on an aspheric surface at which a tangential plane intersects the optical axis perpendicularly.

In order to correct various aberrations more properly, it is preferable that all the surfaces of the five constituent lenses of the imaging lens be aspheric.

The conditional expression (1) defines an adequate range for the ratio of the focal length of the overall optical system of the imaging lens to the maximum image height and indicates a condition to provide a wide angle of view and good imaging performance. If the value is below the lower limit of the conditional expression (1), the focal length of the overall optical system of the imaging lens would be too long, bringing a disadvantage in widening the angle of view. On the other hand, if it is above the upper limit, the angle of view would be too wide, making it difficult to correct aberrations properly and causing deterioration in optical performance.

A more preferable form of the conditional expression (1) is a conditional expression (1a) below:

$$0.95 < ih/f < 1.06 \quad (1a)$$

Preferably the imaging lens according to the present invention satisfies a conditional expression (2) below:

$$0.04 < |r1/r2| < 2.50 \quad (2)$$

where r1 represents the curvature radius of the object-side surface of the first lens and r2 represents the curvature radius of the image-side surface of the first lens.

The conditional expression (2) defines an adequate range for the surface shape of the first lens near the optical axis. If the value is below the lower limit of the conditional expression (2), the positive refractive power of the object-side surface of the first lens would be stronger. Consequently it would be easier to achieve compactness but manufacturing error sensitivity of the surface would be higher, resulting in worsening of spherical aberrations, particularly. On the other hand, if it is above the upper limit, it would be difficult to shorten the total track length.

Preferably the imaging lens according to the present invention satisfies a conditional expression (3) below:

$$0.4 < r6/f < 0.8 \quad (3)$$

where r6 represents the curvature radius of the image-side surface of the third lens.

The conditional expression (3) defines an adequate range for the curvature radius of the image-side surface of the third lens with respect to the focal length of the overall optical system of the imaging lens. If the value is below the lower limit of the conditional expression (3), the exit angle of light rays in the peripheral portion of the image-side surface of the third lens would increase, making it difficult to correct coma aberrations. On the other hand, if it is above the upper limit, the refractive power of the third lens would be too weak, making it difficult to correct field curvature.

Preferably the imaging lens according to the present invention satisfies a conditional expression (4) below:

$$1.94 < |r7/r8| < 3.65 \quad (4)$$

where r7 represents the curvature radius of the object-side surface of the fourth lens and r8 represents the curvature radius of the image-side surface of the fourth lens.

The conditional expression (4) defines an adequate range for the surface shape of the fourth lens near the optical axis. If the value is below the lower limit of the conditional expression (4), the positive refractive power of the fourth lens would be too weak, making it difficult to shorten the total track length. On the other hand, if it is above the upper limit, the positive refractive power of the fourth lens would be too strong, making it difficult to correct spherical aberrations. When the conditional expression (4) is satisfied, spherical aberrations are properly corrected and it is easier to make the imaging lens compact and low-profile.

Preferably the imaging lens according to the present invention satisfies a conditional expression (5) below:

$$1.33 < TTL/f < 2.20 \quad (5)$$

where TTL represents the distance on the optical axis from the object-side surface of the first lens to an image plane without a filter, etc.

The conditional expression (5) defines an adequate range for the ratio of total track length to the focal length of the overall optical system of the imaging lens. If the value is below the lower limit of the conditional expression (5), the total track length would be too short, making it difficult to correct various aberrations properly and resulting in higher manufacturing error sensitivity. On the other hand, if it is above the upper limit, the total track length would be too long, making it difficult to make the imaging lens low-profile.

Preferably the imaging lens according to the present invention satisfies a conditional expression (6) below:

$$0.65<f2/f<1.24 \tag{6}$$

where f2 represents the focal length of the second lens.

The conditional expression (6) defines an adequate range for the positive refractive power of the second lens with respect to the focal length of the overall optical system of the imaging lens. If the value is below the lower limit of the conditional expression (6), the positive refractive power of the second lens would be too strong, making it difficult to correct spherical aberrations properly. On the other hand, if it is above the upper limit, the positive refractive power of the second lens would be too weak, making it difficult to shorten the total track length.

Preferably the imaging lens according to the present invention satisfies a conditional expression (7) below:

$$1.0<|r3|/f \tag{7}$$

where r3 represents the curvature radius of the object-side surface of the second lens.

The conditional expression (7) defines an adequate range for the curvature radius of the object-side surface of the second lens with respect to the focal length of the overall optical system. When the value is above the lower limit of the conditional expression (7), spherical aberrations which occur on the first lens and astigmatism and field curvature can be corrected properly.

As mentioned above, in order to reduce the amount of spherical aberrations which occur on the first lens and shorten the total track length, the condition indicated by the conditional expression (2) is effective and the condition indicated by the conditional expression (7) is also effective in suppressing spherical aberrations which occur on the first lens. More preferable forms of the conditional expressions (2) and (7) are conditional expressions (2a) and (7a) below respectively:

$$0.04<|r1/r2|<1.2 \tag{2a}$$

$$2.0<|r3|/f \tag{7a}$$

The conditional expression (2a) further limits the decrease of the refractive power of the first lens, thereby offering a condition more useful for shortening the total track length. The conditional expression (7a) further limits the increase of the refractive power of the object-side surface of the second lens, thereby offering a condition useful for suppressing the refractive power of the surface concerned and correcting spherical aberrations which occur on the first lens more properly.

Therefore, when the imaging lens is designed to satisfy both the conditional expressions (2a) and (7a), aberrations can be corrected properly and a shorter optical system can be realized.

Preferably, the imaging lens according to the present invention satisfies a conditional expression (8) below:

$$-1.6<f3/f<-1.0 \tag{8}$$

where f3 represents the focal length of the third lens.

The conditional expression (8) defines an adequate range for the negative refractive power of the third lens with respect to the focal length of the overall optical system of the imaging lens. If the value is below the lower limit of the conditional expression (8), the negative refractive power of the third lens would be too weak, making it difficult to correct field curvature and axial chromatic aberrations. On the other hand, if it is above the upper limit, the negative refractive power of the third lens would be too strong, making it difficult to correct coma aberrations and distortion.

By using plastic material for all the constituent lenses in the present invention, the manufacturing process is easier and production cost can be lowered.

DETAILED DESCRIPTION OF THE PREFERRED EMBODIMENTS

Hereinafter, the preferred embodiments of the present invention will be described in detail referring to the accompanying drawings.

FIGS. 1, 3, 5, 7, 9, 11, 13, and 15 are schematic views showing the general configurations of the imaging lenses according to Examples 1 to 8 of the present embodiment respectively. Since all these embodiments have the same basic configuration, a detailed explanation of an imaging lens according to the present embodiment is given below referring to the schematic view of Example 1.

Figure 1:
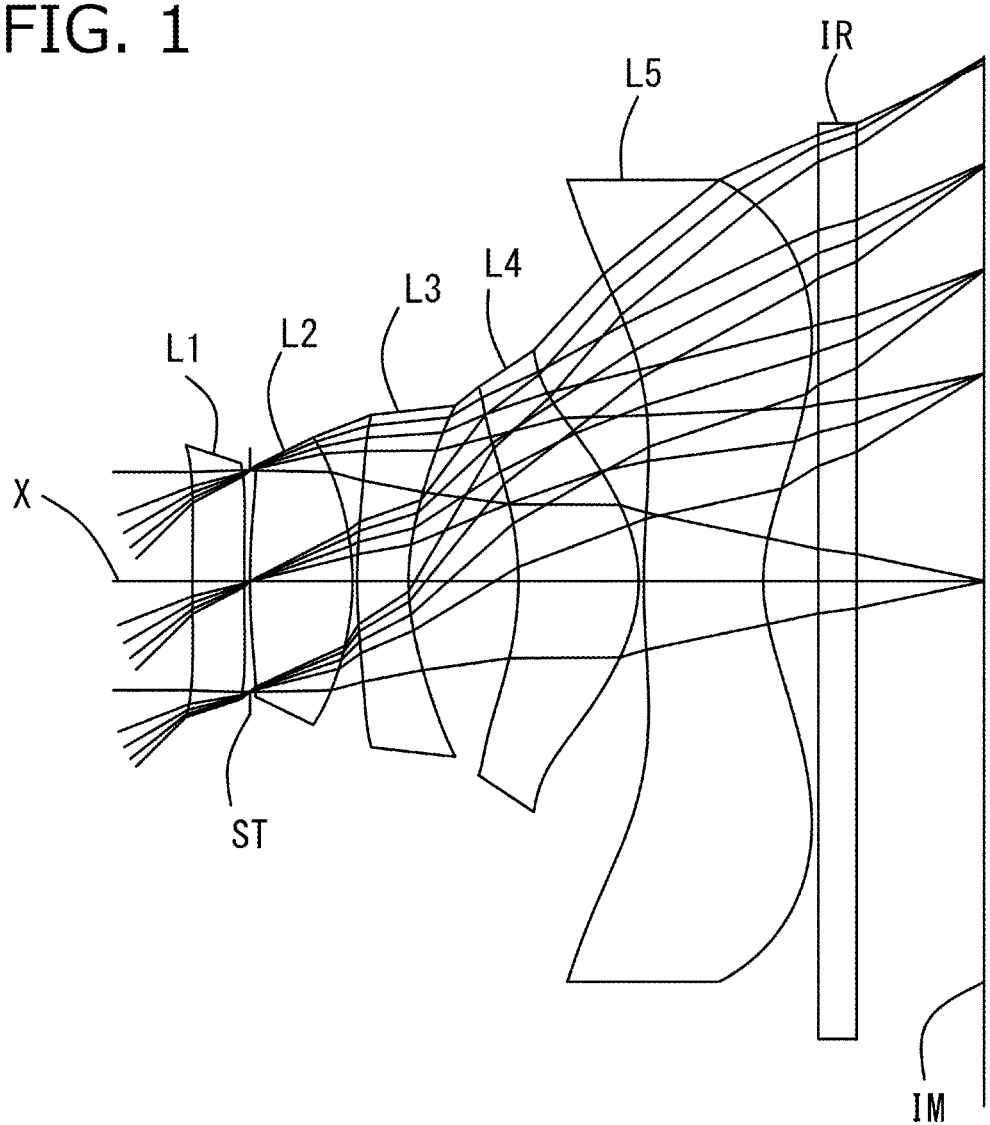
FIG. 1 is a schematic view showing the general configuration of an imaging lens according to Example 1 of the invention.

As shown in FIG. 1, in the imaging lens according to the present embodiment, the elements are arranged in the following order from an object side to an image side: a first lens L1 with positive refractive power, an aperture stop ST, a second lens L2 with positive refractive power, a third lens L3 with negative refractive power, a fourth lens L4 with positive refractive power, and a fifth lens L5 with negative refractive power.

A filter IR is located between the fifth lens L5 and an image plane IM. This filter IR is omissible.

In the above imaging lens composed of five constituent lenses, the first lens L1 is a meniscus double-sided aspheric lens which has a convex surface on the object side near an optical axis X and a concave surface on the image side; the second lens L2 is a biconvex lens which has convex object-side and image-side surfaces; the third lens L3 is a meniscus lens which has a convex object-side surface and a concave image-side surface; the fourth lens L4 is a meniscus lens which has a concave surface on the object side near the optical axis X and a convex surface on the image side near the optical axis X; and the fifth lens L5 is a meniscus lens which has a convex surface on the object side near the optical axis X and a concave surface on the image side near the optical axis X.

The first lens L1 is designed to have relatively weak refractive power and both its surfaces are aspheric in which the aspheric shape of the object-side surface gradually changes from convex in the vicinity of the optical axis X to concave in the peripheral portion. This aspheric shape is effective in correcting spherical aberrations and astigmatism at a high image height position. The first lens L1 should be at least a lens having a convex surface on the object side near the optical axis X and it may be a biconvex lens as in Example 2. The first lens L1 may have negative refractive power as in Example 3. Furthermore, as in Examples 7 and 8, the distance between the first lens L1 and the second lens L2 may be increased to increase the effective diameter and both the object-side surface and the image-side surface have aspheric shapes which uniformly change, so that light rays can be taken in at a wider angle.

The second lens L2 has relatively strong refractive power among the five constituent lenses. As it is a biconvex lens, its positive refractive power is shared by the object-side surface and the image-side surface so as to generate strong refractive power while preventing a rise in the tolerance sensitivity of the surfaces, thereby shortening the total track length. The second lens L2 should be at least a lens with positive refractive power having a convex image-side surface and as in Example 4, it may be a meniscus lens having a convex image-side surface. In that case, if the curvature radius of the object-side surface is larger than that of the image-side surface, astigmatism and field curvature are corrected effectively.

The third lens L3 is a lens with negative refractive power having a concave image-side surface and corrects spherical aberrations and chromatic aberrations.

The fourth lens L4 is a lens with positive refractive power having a convex image-side surface and mainly corrects astigmatism and field curvature.

The fifth lens L5 is a meniscus lens with negative refractive power having a concave surface on the image side. It ensures an adequate back focus and mainly corrects distortion and field curvature and controls the angle of light rays incident on the image sensor through its aspheric shapes with pole-change points on the object-side surface and the image-side surface.

The imaging lens according to this embodiment uses plastic material for all the constituent lenses so that it can be mass-produced at low cost. More specifically, for the first lens L1, the second lens L2, the fourth lens L4, and the fifth lens L5, a low-dispersion cycloolefin plastic material with an Abbe number of 50 to 60 is used and for the third lens L3, a high-dispersion polycarbonate plastic material with an Abbe number of 20 to 30 is used. The use of the high-dispersion material for the third lens L3 permits proper correction of chromatic aberrations.

The imaging lens according to the present invention satisfies the following conditional expressions:

$$0.9 < ih/f < 1.1 \quad (1)$$

$$0.04 < |r1/r2| < 2.50 \quad (2)$$

$$0.4 < r6/f < 0.8 \quad (3)$$

$$1.94 < |r7/r8| < 3.65 \quad (4)$$

$$1.33 < TTL/f < 2.20 \quad (5)$$

$$0.65 < f2/f < 1.24 \quad (6)$$

$$1.0 < |r3|/f \quad (7)$$

$$-1.6 < f3/f < -1.0 \quad (8)$$

where
f: focal length of the overall optical system of the imaging lens
f2: focal length of the second lens L2
f3: focal length of the third lens L3
ih: maximum image height
r1: curvature radius of the object-side surface of the first lens L1
r2: curvature radius of the image-side surface of the first lens L1
r3: curvature radius of the object-side surface of the second lens L2
r6: curvature radius of the image-side surface of the third lens L3
r7: curvature radius of the object-side surface of the fourth lens L4
r8: curvature radius of the image-side surface of the fourth lens L4
TTL: distance on the optical axis X from the object-side surface of the first lens L1 to the image plane IM without the filter IR, etc.

In this embodiment, all the lens surfaces are aspheric. The aspheric shapes of these lens surfaces are expressed by Equation 1, where Z represents an axis in the optical axis direction, H represents a height perpendicular to the optical axis, k represents a conic constant, and A4, A6, A8, A10, A12, A14, and A16 represent aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \quad \text{Equation 1}$$

Next, the imaging lenses according to the preferred embodiments of the present invention will be explained. In the description of each embodiment, f represents the focal length of the overall optical system of the imaging lens, Fno represents an F-number, ω represents a half angle of view, and ih represents a maximum image height. i represents a surface number counted from the object side, r represents a curvature radius, d represents the distance between lens surfaces on the optical axis (surface distance), Nd represents a refractive index at d-ray (reference wavelength), and vd represents an Abbe number at d-ray. In connection with aspheric surfaces, an asterisk (*) after surface number i indicates that the surface concerned is an aspheric surface.

Example 1

The basic lens data of Example 1 is shown below in Table 1.

As shown in Table 9, the imaging lens according to Example 1 satisfies all the conditional expressions (1) to (8).

Figure 2:
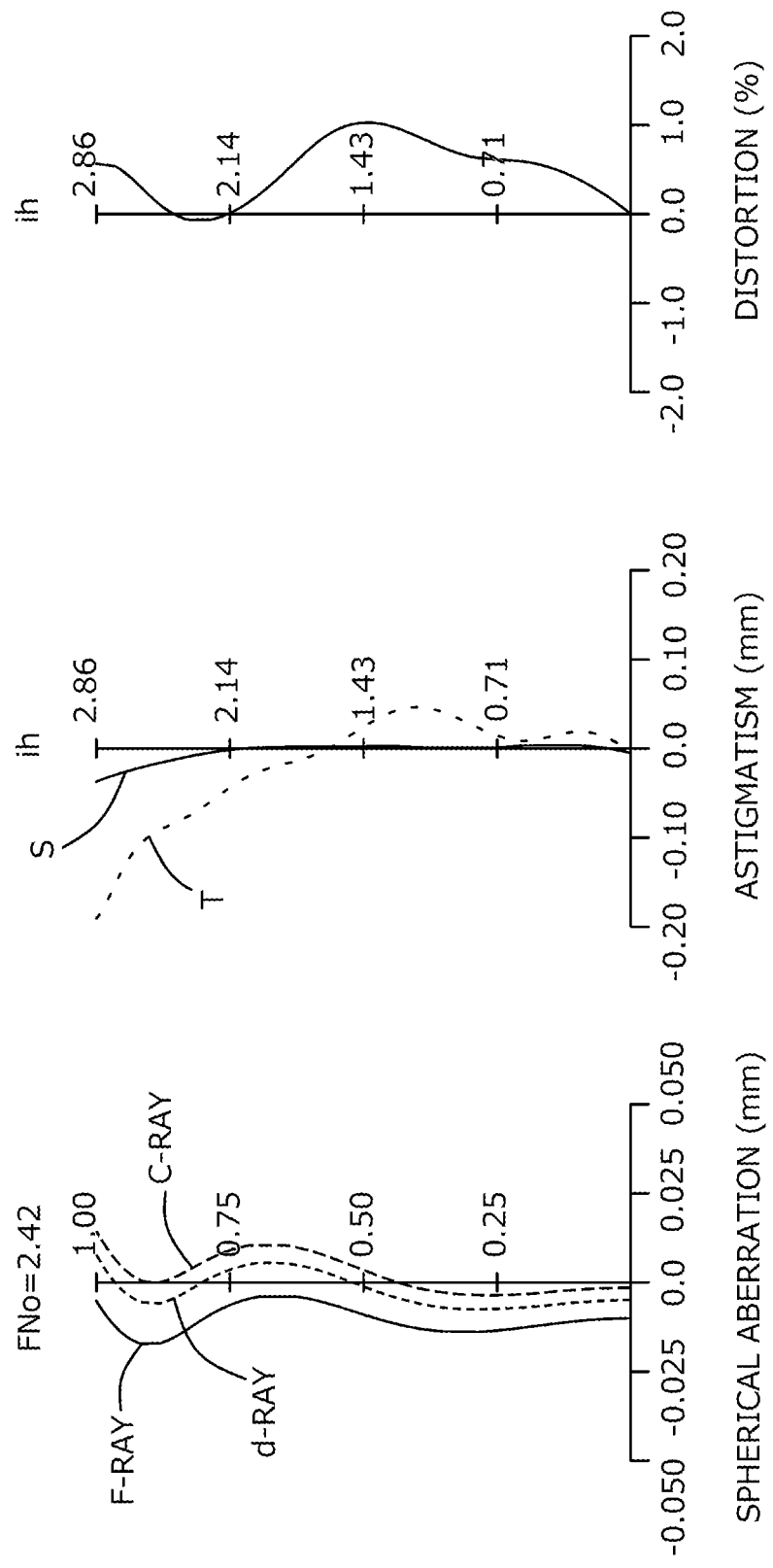
FIG. 2 shows spherical aberration, astigmatism, and distortion of the imaging lens according to Example 1.
Figure 3:
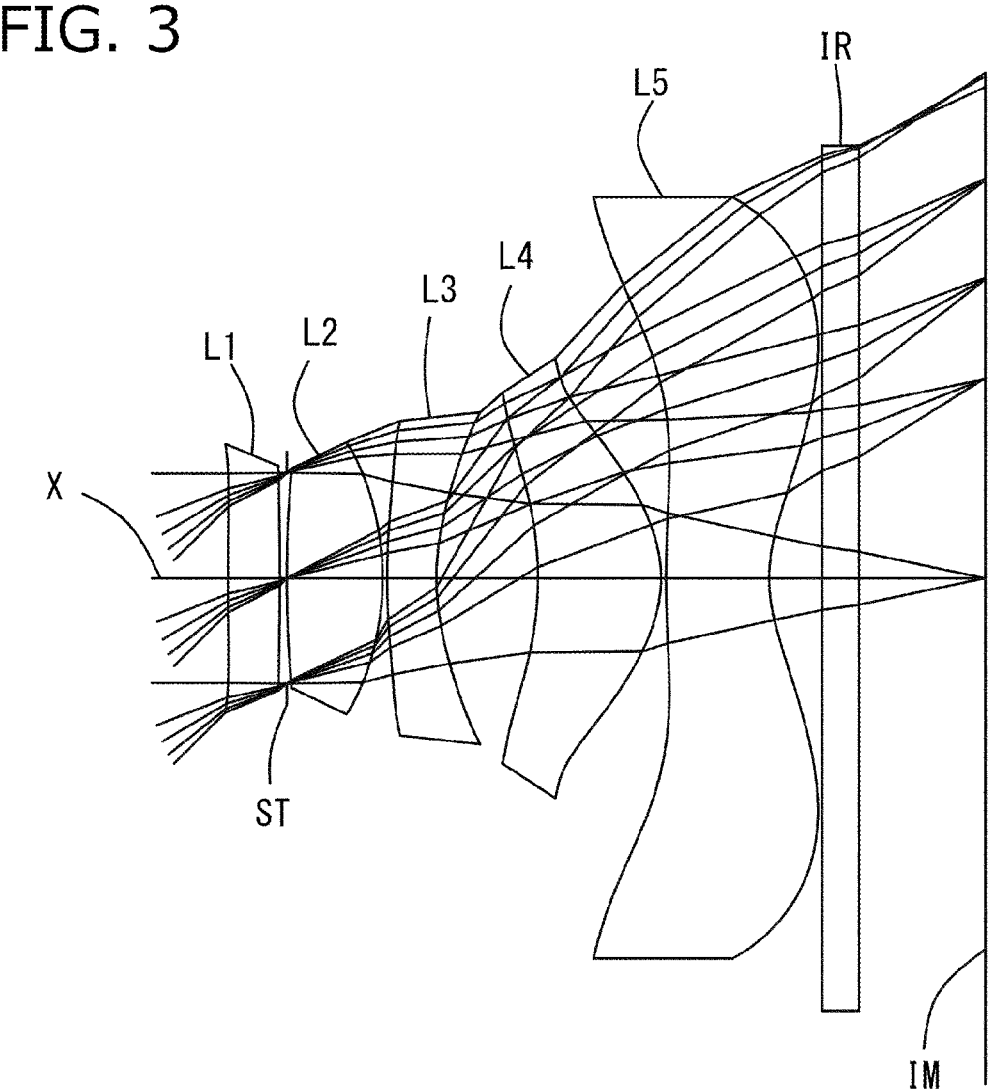
FIG. 3 is a schematic view showing the general configuration of an imaging lens according to Example 2 of the invention.

FIG. 2 shows spherical aberration (mm), astigmatism (mm), and distortion (%) of the imaging lens according to Example 1. The spherical aberration graph shows the amount of aberration at wavelengths of F-ray (486 nm), d-ray (588 nm), and C-ray (656 nm). The astigmatism graph shows the amount of aberration on sagittal image surface S and the amount of aberration on tangential image surface T (the same

TABLE 1

Numerical Example 1 in mm
$f = 2.865$
$Fno = 2.42$
$\omega(°) = 44.70$
$ih = 2.855$ Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 15.869 | 0.282 | 1.5346 | 56.16 |
| 2* | 17.116 | 0.031 | | |
| 3 (Stop) | Infinity | 0.000 | | |
| 4* | 4.470 | 0.559 | 1.5438 | 55.57 |
| 5* | −1.393 | 0.025 | | |
| 6* | 3.325 | 0.280 | 1.6355 | 23.91 |
| 7* | 1.258 | 0.599 | | |
| 8* | −1.689 | 0.656 | 1.5438 | 55.57 |
| 9* | −0.785 | 0.028 | | |
| 10* | 4.457 | 0.651 | 1.5346 | 56.16 |
| 11* | 0.956 | 0.300 | | |
| 12 | Infinity | 0.210 | 1.5168 | 64.20 |
| 13 | Infinity | 0.693 | | |
| Image Plane | Infinity | | | |

Constituent Lens Data

| Lens | Start Surface | Focal Length |
|---|---|---|
| 1 | 2 | 377.595 |
| 2 | 4 | 2.021 |
| 3 | 6 | −3.360 |
| 4 | 8 | 2.146 |
| 5 | 10 | −2.435 |

Aspheric Surface Data

| | 1st Surface | 2nd Surface | 4th Surface | 5th Surface | 6th Surface |
|---|---|---|---|---|---|
| k   | 0.000E+00 | 2.893E+02 | 0.000E+00 | −1.165E+01 | 0.000E+00 |
| A4  | −9.322E−02 | −1.589E−02 | 1.155E−01 | −2.012E−01 | −1.418E−01 |
| A6  | −4.164E−01 | −4.997E−01 | −6.383E−01 | 6.691E−02 | −8.522E−02 |
| A8  | 1.321E+00 | 2.717E−01 | 5.391E−01 | −9.255E−02 | 3.113E−01 |
| A10 | −2.127E+00 | −1.646E−01 | −6.684E−01 | −1.293E−01 | −1.145E−01 |
| A12 | 1.121E+00 | 0.000E+00 | 0.000E+00 | 0.000E+00 | −1.621E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k   | −7.076E+00 | 1.235E+00 | −4.231E+00 | 0.000E+00 | −5.763E+00 |
| A4  | −4.516E−03 | 1.412E−01 | −4.589E−01 | −1.348E−01 | −1.119E−01 |
| A6  | 5.596E−02 | −1.243E−01 | 8.742E−01 | 2.923E−02 | 7.471E−02 |
| A8  | −9.438E−02 | 3.832E−01 | −1.284E+00 | −2.113E−03 | −4.463E−02 |
| A10 | 1.454E−01 | −1.724E−01 | 1.207E+00 | 0.000E+00 | 1.690E−02 |
| A12 | −5.640E−02 | −1.852E−01 | −5.514E−01 | 0.000E+00 | −3.901E−03 |
| A14 | 0.000E+00 | 2.346E−01 | 9.407E−02 | 0.000E+00 | 4.982E−04 |
| A16 | 0.000E+00 | −7.337E−02 | 0.000E+00 | 0.000E+00 | −2.716E−05 | is true for FIGS. 4, 6, 8, 10, 12, 14, and 16). As shown in FIG. 2, various aberrations are properly corrected.

The imaging lens provides a wide angle of view of about 90 degrees and high brightness with an F-value of about 2.4. Its total track length TTL is as short as 4.24 mm and the ratio of total track length TTL to maximum image height ih (TTL/2ih) is 0.74, which suggests that it offers a low-profile design though it includes five constituent lenses.

Example 2

The basic lens data of Example 2 is shown below in Table 2.

TABLE 2

Numerical Example 2 in mm
f = 2.863
Fno = 2.43
ω(°) = 44.75
ih = 2.855

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 13.470 | 0.295 | 1.5346 | 56.16 |
| 2* | −13.776 | 0.041 | | |
| 3 (Stop) | Infinity | 0.000 | | |
| 4* | 9.677 | 0.544 | 1.5438 | 55.57 |
| 5* | −1.537 | 0.025 | | |
| 6* | 3.534 | 0.280 | 1.6355 | 23.91 |
| 7* | 1.365 | 0.577 | | |
| 8* | −1.872 | 0.700 | 1.5438 | 55.57 |
| 9* | −0.732 | 0.028 | | |
| 10* | 5.100 | 0.586 | 1.5346 | 56.16 |
| 11* | 0.843 | 0.300 | | |
| 12 | Infinity | 0.210 | 1.5168 | 64.20 |
| 13 | Infinity | 0.717 | | |
| Image Plane | Infinity | | | |

Constituent Lens Data

| Lens | Start Surface | Focal Length |
|---|---|---|
| 1 | 2 | 12.777 |
| 2 | 4 | 2.481 |
| 3 | 6 | −3.685 |
| 4 | 8 | 1.817 |
| 5 | 10 | −1.984 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | −1.259E+01 | 0.000E+00 |
| A4 | −5.866E−02 | 1.212E−01 | 1.809E−01 | −2.533E−01 | −1.396E−01 |
| A6 | −3.298E−01 | −3.355E−01 | −5.561E−01 | 1.228E−01 | −3.622E−02 |
| A8 | 1.238E+00 | 6.296E−01 | 9.067E−01 | 5.358E−03 | 2.276E−01 |
| A10 | −2.039E+00 | −8.482E−01 | −1.182E+00 | −1.449E−01 | −6.296E−02 |
| A12 | 1.123E+00 | 0.000E+00 | 0.000E+00 | 0.000E+00 | −1.882E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | −6.774E+00 | 1.754E+00 | −4.191E+00 | 0.000E+00 | −5.880E+00 |
| A4 | 1.551E−02 | 1.170E−01 | −4.555E−01 | −1.359E−01 | −1.108E−01 |
| A6 | 2.222E−02 | −1.583E−01 | 8.665E−01 | 3.063E−02 | 7.360E−02 |
| A8 | −7.108E−02 | 4.493E−01 | −1.299E+00 | −2.206E−03 | −4.421E−02 |
| A10 | 1.366E−01 | −2.314E−01 | 1.205E+00 | 0.000E+00 | 1.699E−02 |
| A12 | −5.469E−02 | −1.615E−01 | −5.330E−01 | 0.000E+00 | −4.031E−03 |
| A14 | 0.000E+00 | 2.350E−01 | 8.741E−02 | 0.000E+00 | 5.330E−04 |
| A16 | 0.000E+00 | −7.473E−02 | 0.000E+00 | 0.000E+00 | −3.016E−05 |

As shown in Table 9, the imaging lens according to Example 2 satisfies all the conditional expressions (1) to (8).

Figure 4:
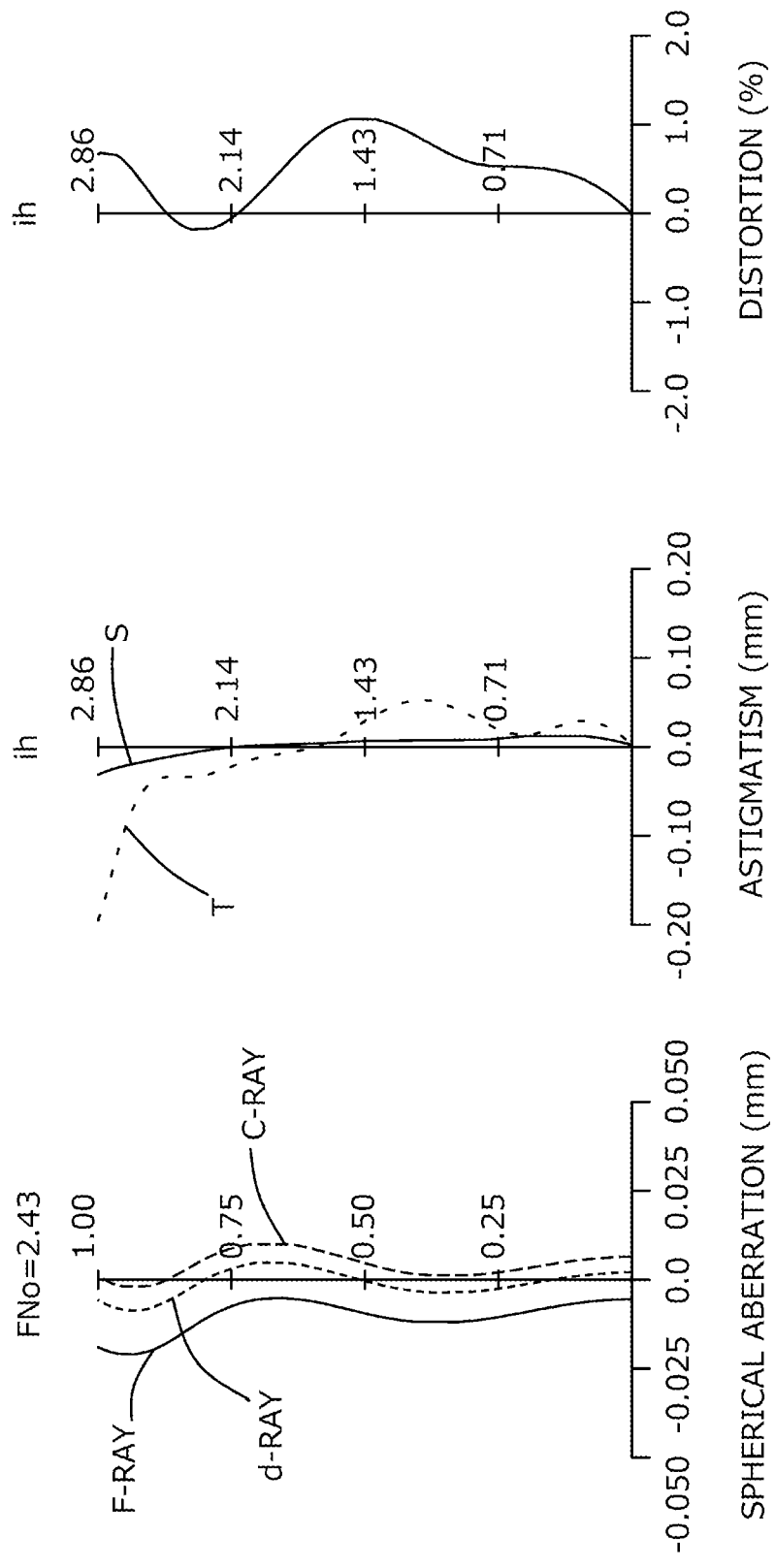
FIG. 4 shows spherical aberration, astigmatism, and distortion of the imaging lens according to Example 2.
Figure 5:
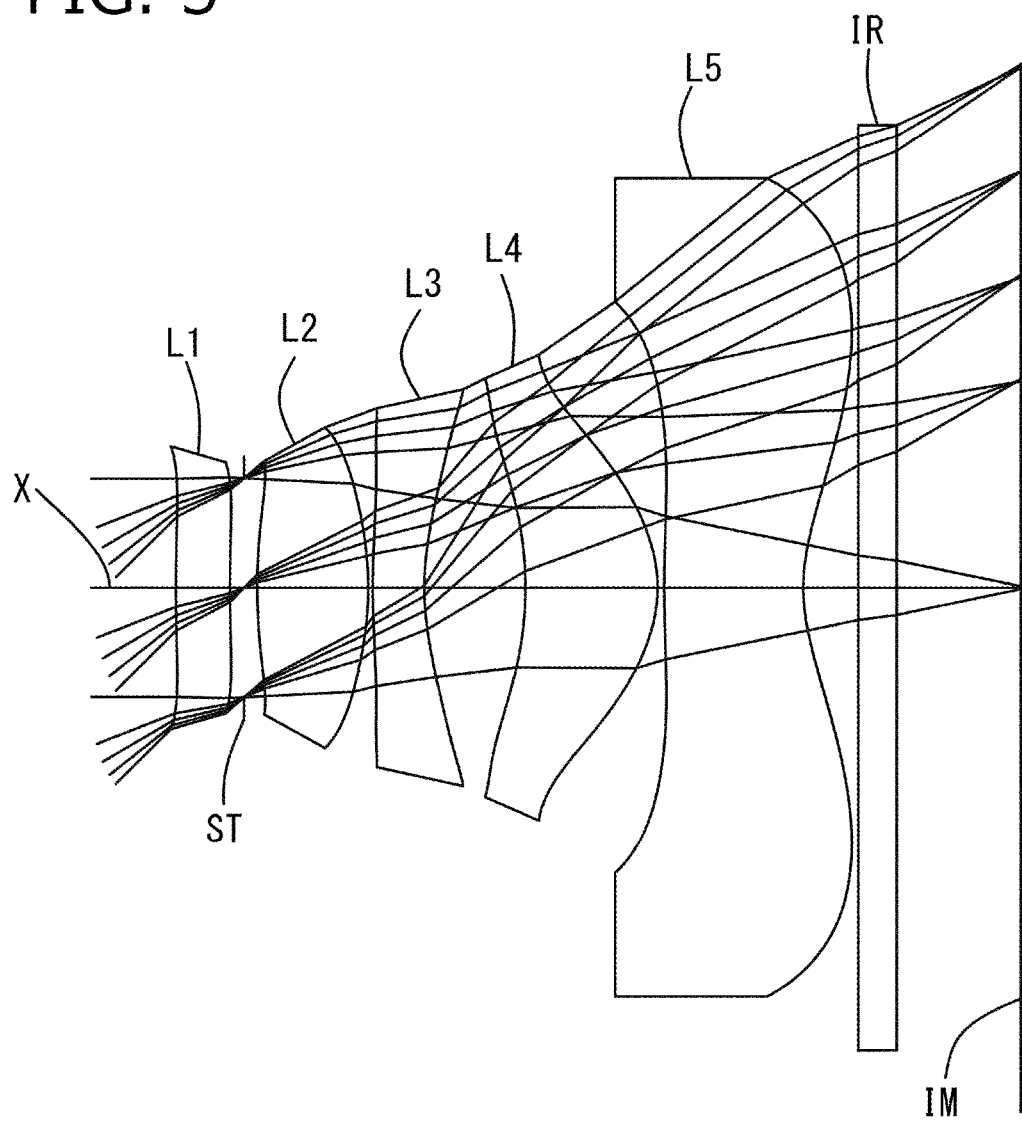
FIG. 5 is a schematic view showing the general configuration of an imaging lens according to Example 3 of the invention.

FIG. 4 shows spherical aberration (mm), astigmatism (mm), and distortion (%) of the imaging lens according to Example 2. As shown in FIG. 4, various aberrations are properly corrected.

The imaging lens provides a wide angle of view of about 90 degrees and high brightness with an F-value of about 2.4. Its total track length TTL is as short as 4.23 mm and the ratio of total track length TTL to maximum image height ih (TTL/2ih) is 0.74, which suggests that it offers a low-profile design though it includes five constituent lenses.

Example 3

The basic lens data of Example 3 is shown below in Table 3.

TABLE 3

Numerical Example 3 in mm
$f = 2.865$
$Fno = 2.43$
$\omega(°) = 44.78$
$ih = 2.855$ Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 8.906 | 0.295 | 1.5346 | 56.16 |
| 2* | 8.262 | 0.077 | | |
| 3 (Stop) | Infinity | 0.072 | | |
| 4* | 3.422 | 0.605 | 1.5438 | 55.57 |
| 5* | −1.625 | 0.025 | | |
| 6* | 4.549 | 0.280 | 1.6355 | 23.91 |
| 7* | 1.423 | 0.552 | | |
| 8* | −1.880 | 0.719 | 1.5438 | 55.57 |
| 9* | −0.785 | 0.037 | | |
| 10* | 6.733 | 0.758 | 1.5346 | 56.16 |
| 11* | 1.031 | 0.300 | | |
| 12 | Infinity | 0.210 | 1.5168 | 64.20 |
| 13 | Infinity | 0.676 | | |
| Image Plane | Infinity | | | |

Constituent Lens Data

| Lens | Start Surface | Focal Length |
|---|---|---|
| 1 | 2 | −253.965 |
| 2 | 4 | 2.115 |
| 3 | 6 | −3.374 |
| 4 | 8 | 2.011 |
| 5 | 10 | −2.389 |

Aspheric Surface Data

| | 1st Surface | 2nd Surface | 4th Surface | 5th Surface | 6th Surface |
|---|---|---|---|---|---|
| k | 0.000E+00 | −1.777E+01 | 0.000E+00 | −2.035E+01 | 0.000E+00 |
| A4 | −1.025E−02 | −3.741E−02 | 9.968E−02 | −1.254E−01 | −1.744E−01 |
| A6 | −6.245E−01 | −4.603E−01 | −5.622E−01 | 2.502E−02 | −9.530E−02 |
| A8 | 1.530E+00 | −4.431E−02 | 5.695E−01 | 4.598E−02 | 3.823E−01 |
| A10 | −2.242E+00 | 2.925E−01 | −9.124E−01 | −2.218E−01 | −1.869E−01 |
| A12 | 1.121E+00 | 0.000E+00 | 0.000E+00 | 0.000E+00 | −1.630E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | −1.190E+01 | 8.265E−01 | −4.269E+00 | 0.000E+00 | −6.037E+00 |
| A4 | −3.539E−02 | 6.362E−02 | −5.300E−01 | −1.347E−01 | −1.102E−01 |
| A6 | 5.257E−02 | −1.181E−01 | 9.146E−01 | 5.541E−02 | 7.757E−02 |
| A8 | −1.069E−01 | 4.072E−01 | −1.285E+00 | −1.293E−02 | −4.548E−02 |
| A10 | 1.598E−01 | −1.944E−01 | 1.197E+00 | 0.000E+00 | 1.724E−02 |
| A12 | −7.923E−02 | −1.993E−01 | −5.565E−01 | 0.000E+00 | −3.984E−03 |
| A14 | 0.000E+00 | 2.273E−01 | 9.936E−02 | 0.000E+00 | 5.013E−04 |
| A16 | 0.000E+00 | −6.546E−02 | 0.000E+00 | 0.000E+00 | −2.641E−05 |

As shown in Table 9, the imaging lens according to Example 3 satisfies all the conditional expressions (1) to (8).

Figure 6:
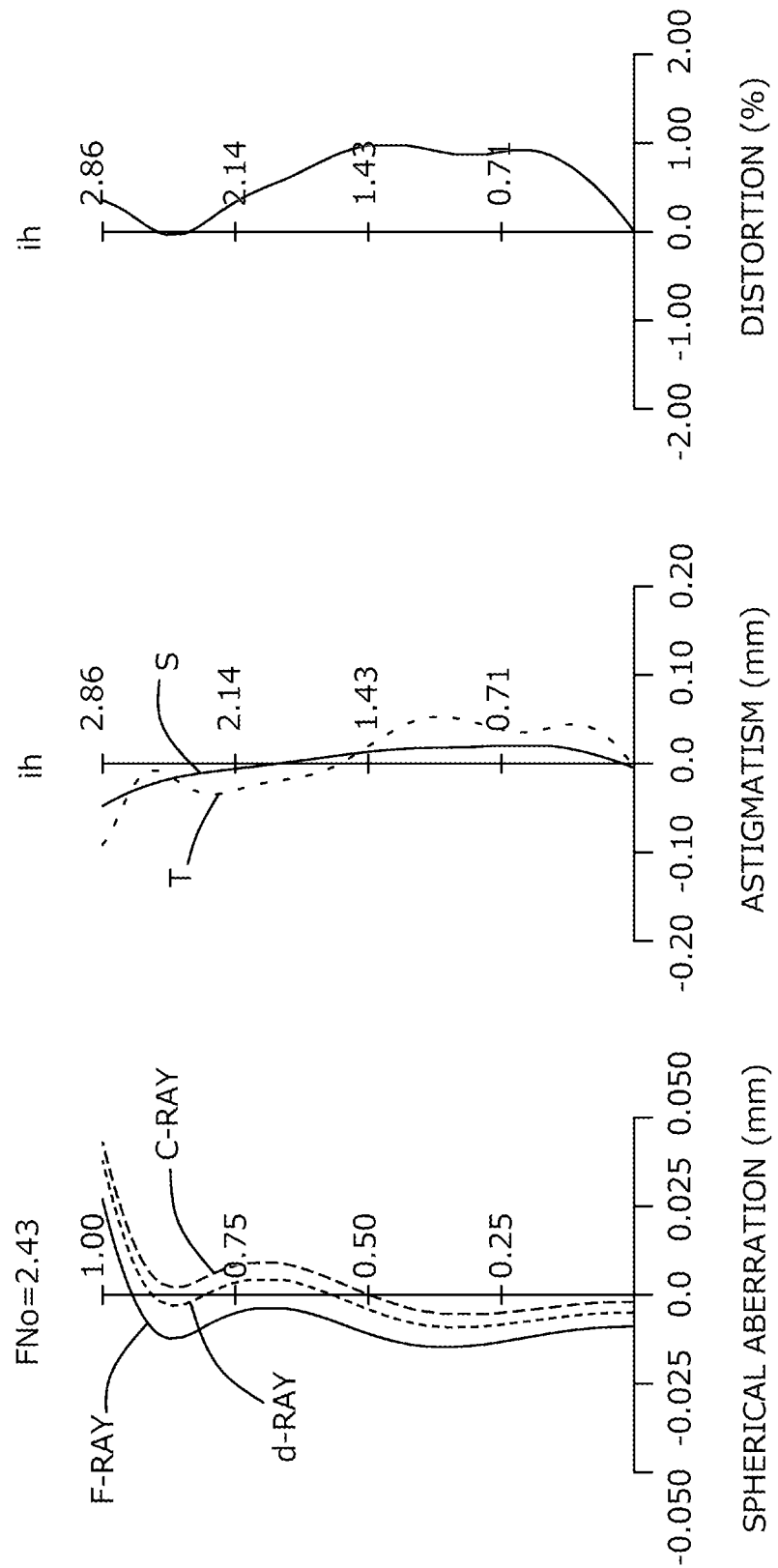
FIG. 6 shows spherical aberration, astigmatism, and distortion of the imaging lens according to Example 3.
Figure 7:
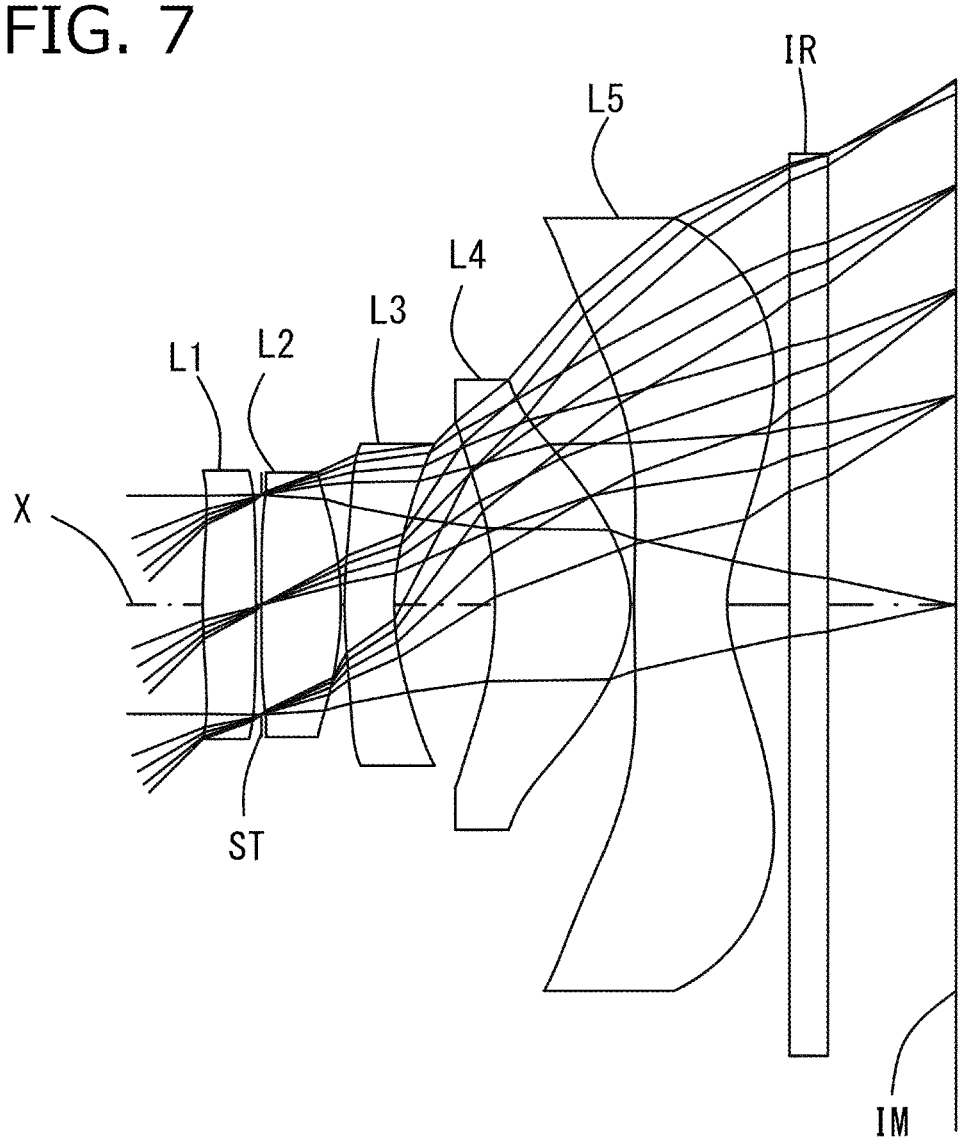
FIG. 7 is a schematic view showing the general configuration of an imaging lens according to Example 4 of the invention.

FIG. 6 shows spherical aberration (mm), astigmatism (mm), and distortion (%) of the imaging lens according to Example 3. As shown in FIG. 6, various aberrations are properly corrected.

The imaging lens provides a wide angle of view of about 90 degrees and high brightness with an F-value of about 2.4. Its total track length TTL is as short as 4.54 mm and the ratio of total track length TTL to maximum image height ih (TTL/2ih) is 0.79, which suggests that it offers a low-profile design though it includes five constituent lenses.

Example 4

The basic lens data of Example 4 is shown below in Table 4.

TABLE 4

Numerical Example 4 in mm
$f = 2.859$
$Fno = 2.41$
$\omega(°) = 44.74$
$ih = 2.855$ Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 3.773 | 0.289 | 1.5346 | 56.16 |
| 2* | −26.703 | 0.031 | | |
| 3 (Stop) | Infinity | 0.000 | | |
| 4* | −90.000 | 0.433 | 1.5438 | 55.57 |
| 5* | −1.727 | 0.020 | | |
| 6* | 2.842 | 0.270 | 1.6355 | 23.91 |
| 7* | 1.300 | 0.550 | | |
| 8* | −1.972 | 0.738 | 1.5438 | 55.57 |
| 9* | −0.655 | 0.020 | | |
| 10* | 7.711 | 0.507 | 1.5346 | 56.16 |
| 11* | 0.752 | 0.340 | | |
| 12 | Infinity | 0.210 | 1.5168 | 64.20 |
| 13 | Infinity | 0.697 | | |
| Image Plane | Infinity | | | |

Constituent Lens Data

| Lens | Start Surface | Focal Length |
|---|---|---|
| 1 | 2 | 6.204 |
| 2 | 4 | 3.232 |
| 3 | 6 | −4.045 |
| 4 | 8 | 1.506 |
| 5 | 10 | −1.599 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | −1.840E+01 | 0.000E+00 |
| A4 | −1.556E−01 | 1.047E−02 | 2.661E−01 | −2.535E−01 | −2.356E−01 |
| A6 | −3.945E−01 | −2.086E−01 | −3.369E−01 | 3.638E−01 | −5.314E−02 |
| A8 | 1.105E+00 | 1.052E−01 | 4.746E−01 | −3.866E−01 | 4.288E−01 |
| A10 | −1.877E+00 | −1.759E−01 | −3.989E−01 | 5.104E−01 | −1.240E−01 |
| A12 | 1.123E+00 | 0.000E+00 | 0.000E+00 | 0.000E+00 | −1.904E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | −5.924E+00 | 2.517E+00 | −4.068E+00 | 0.000E+00 | −6.417E+00 |
| A4 | −4.200E−02 | 6.356E−02 | −4.832E−01 | −1.496E−01 | −1.182E−01 |
| A6 | 7.856E−02 | −7.466E−02 | 8.874E−01 | 4.206E−02 | 7.028E−02 |
| A8 | −8.794E−02 | 3.609E−01 | −1.325E+00 | −3.905E−03 | −3.985E−02 |
| A10 | 1.650E−01 | −1.976E−01 | 1.214E+00 | 0.000E+00 | 1.508E−02 |
| A12 | −4.970E−02 | −1.463E−01 | −5.261E−01 | 0.000E+00 | −3.682E−03 |
| A14 | 0.000E+00 | 2.350E−01 | 8.336E−02 | 0.000E+00 | 5.181E−04 |
| A16 | 0.000E+00 | −7.311E−02 | 0.000E+00 | 0.000E+00 | −3.199E−05 |

As shown in Table 9, the imaging lens according to Example 4 satisfies all the conditional expressions (1) to (8).

Figure 8:
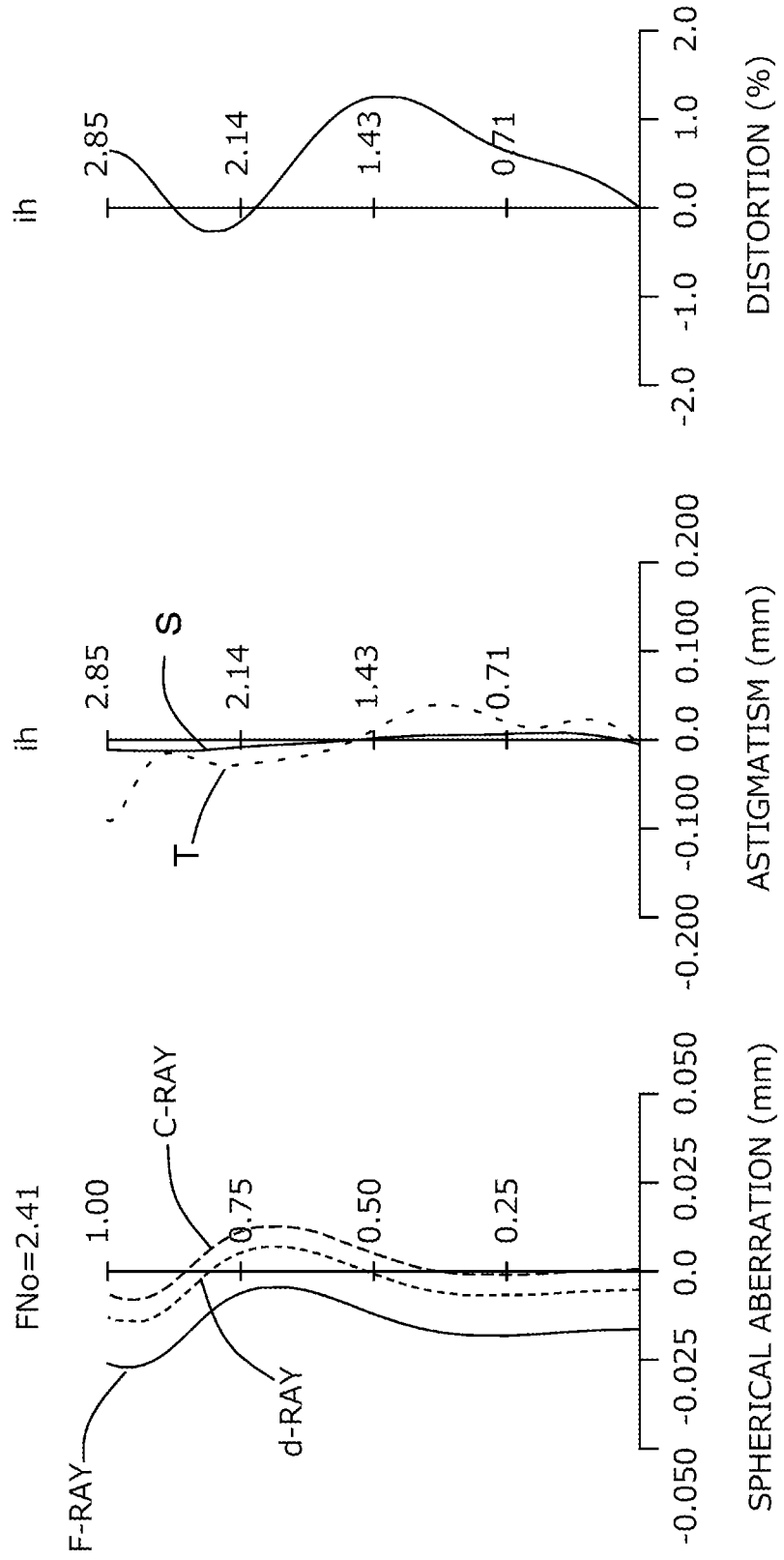
FIG. 8 shows spherical aberration, astigmatism, and distortion of the imaging lens according to Example 4.
Figure 9:
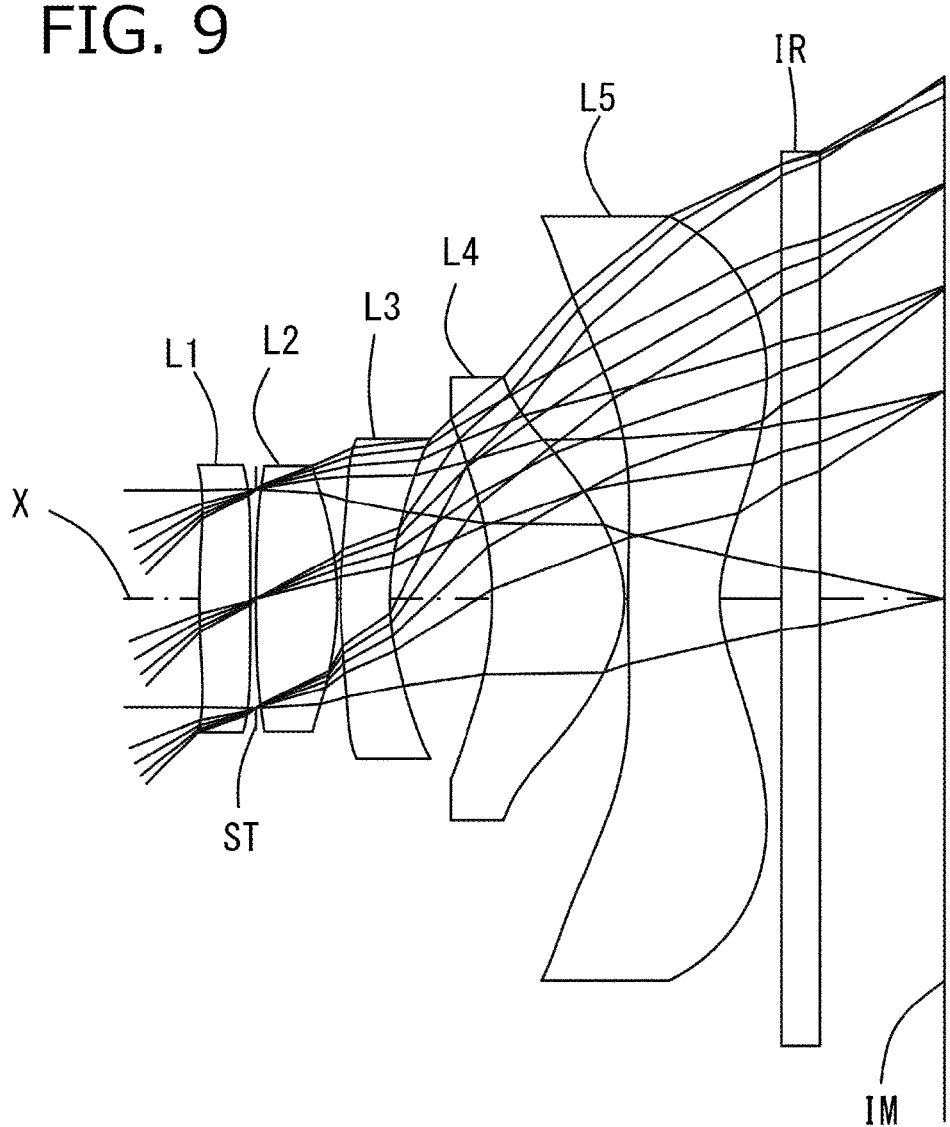
FIG. 9 is a schematic view showing the general configuration of an imaging lens according to Example 5 of the invention.

FIG. 8 shows spherical aberration (mm), astigmatism (mm), and distortion (%) of the imaging lens according to Example 4. As shown in FIG. 8, various aberrations are properly corrected.

The imaging lens provides a wide angle of view of about 90 degrees and high brightness with an F-value of about 2.4. Its total track length TTL is as short as 4.03 mm and the ratio of total track length TTL to maximum image height ih (TTL/2ih) is 0.71, which suggests that it offers a low-profile design though it includes five constituent lenses.

Example 5

The basic lens data of Example 5 is shown below in Table 5.

TABLE 5

Numerical Example 5 in mm
f = 2.864
Fno = 2.41
ω(°) = 44.74
ih = 2.855

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 4.129 | 0.282 | 1.5346 | 56.16 |
| 2* | −95.000 | 0.031 | | |
| 3 (Stop) | Infinity | 0.000 | | |
| 4* | 24.010 | 0.446 | 1.5438 | 55.57 |
| 5* | −1.707 | 0.020 | | |
| 6* | 2.815 | 0.270 | 1.6355 | 23.91 |
| 7* | 1.284 | 0.564 | | |
| 8* | −1.953 | 0.728 | 1.5438 | 55.57 |
| 9* | −0.654 | 0.020 | | |
| 10* | 7.980 | 0.507 | 1.5346 | 56.16 |
| 11* | 0.751 | 0.340 | | |
| 12 | Infinity | 0.210 | 1.5168 | 64.20 |
| 13 | Infinity | 0.685 | | |
| Image Plane | Infinity | | | |

Constituent Lens Data

| Lens | Start Surface | Focal Length |
|---|---|---|
| 1 | 2 | 7.409 |
| 2 | 4 | 2.949 |
| 3 | 6 | −3.991 |
| 4 | 8 | 1.511 |
| 5 | 10 | −1.589 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | −1.768E+01 | 0.000E+00 |
| A4 | −1.675E−01 | −1.373E−02 | 2.421E−01 | −2.450E−01 | −2.264E−01 |
| A6 | −3.809E−01 | −2.770E−01 | −3.743E−01 | 3.476E−01 | −5.821E−02 |
| A8 | 1.098E+00 | 2.086E−01 | 4.211E−01 | −4.379E−01 | 4.022E−01 |
| A10 | −1.852E+00 | −1.513E−01 | −2.909E−01 | 4.845E−01 | −1.267E−01 |
| A12 | 1.123E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | −5.847E+00 | 2.510E+00 | −4.000E+00 | 0.000E+00 | −6.234E+00 |
| A4 | −4.240E−02 | 5.978E−02 | −4.761E−01 | −1.511E−01 | −1.270E−01 |
| A6 | 8.106E−02 | −7.700E−02 | 8.789E−01 | 4.316E−02 | 7.876E−02 |
| A8 | −8.948E−02 | 3.586E−01 | −1.326E+00 | −4.007E−03 | −4.374E−02 |
| A10 | 1.630E−01 | −2.019E−01 | 1.218E+00 | 0.000E+00 | 1.594E−02 |
| A12 | −4.967E−02 | −1.339E−01 | −5.258E−01 | 0.000E+00 | −3.732E−03 |
| A14 | 0.000E+00 | 2.350E−01 | 8.287E−02 | 0.000E+00 | 5.071E−04 |
| A16 | 0.000E+00 | −7.452E−02 | 0.000E+00 | 0.000E+00 | −3.056E−05 |

As shown in Table 9, the imaging lens according to Example 5 satisfies all the conditional expressions (1) to (8).

Figure 10:
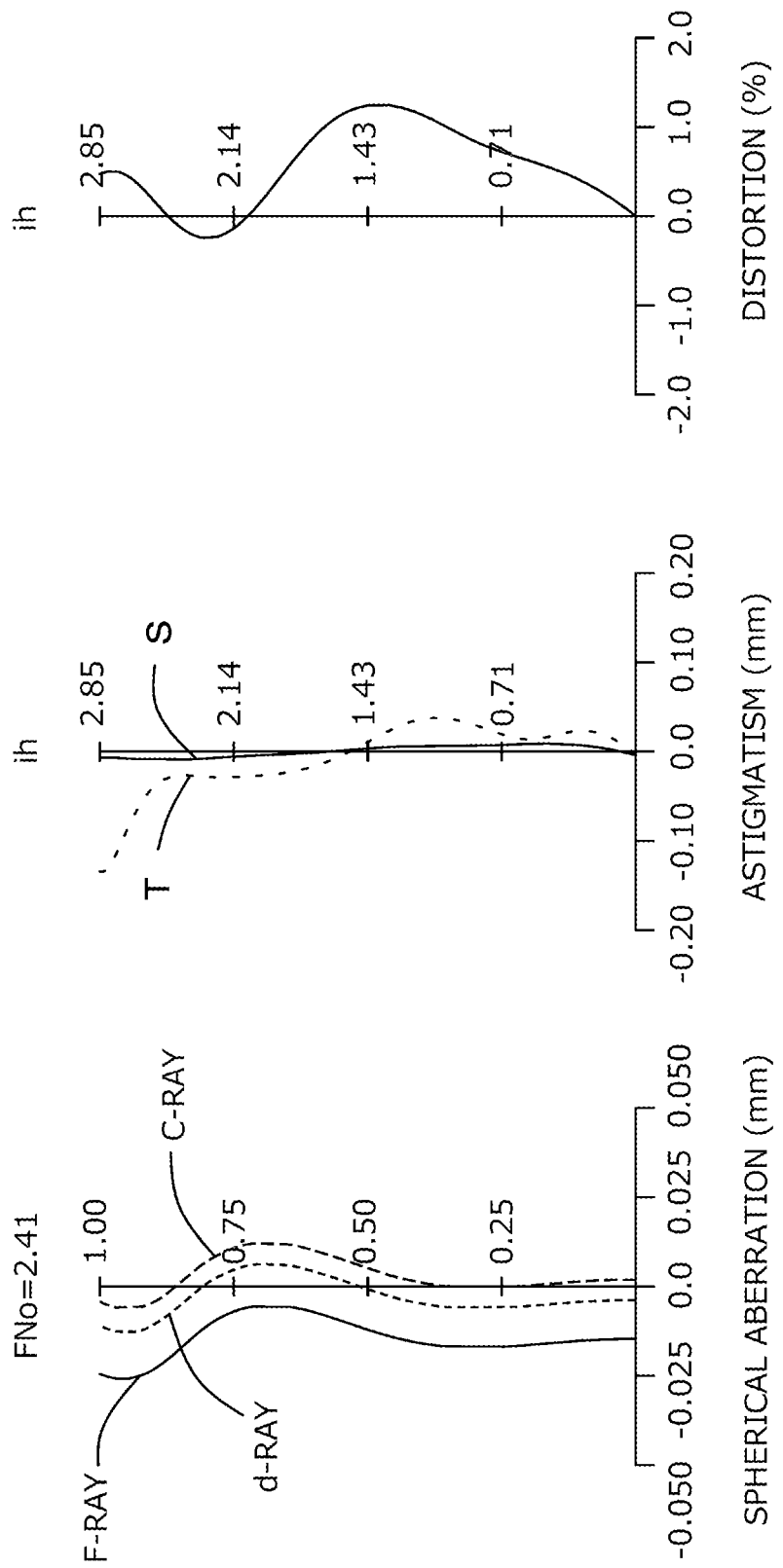
FIG. 10 shows spherical aberration, astigmatism, and distortion of the imaging lens according to Example 5.
Figure 11:
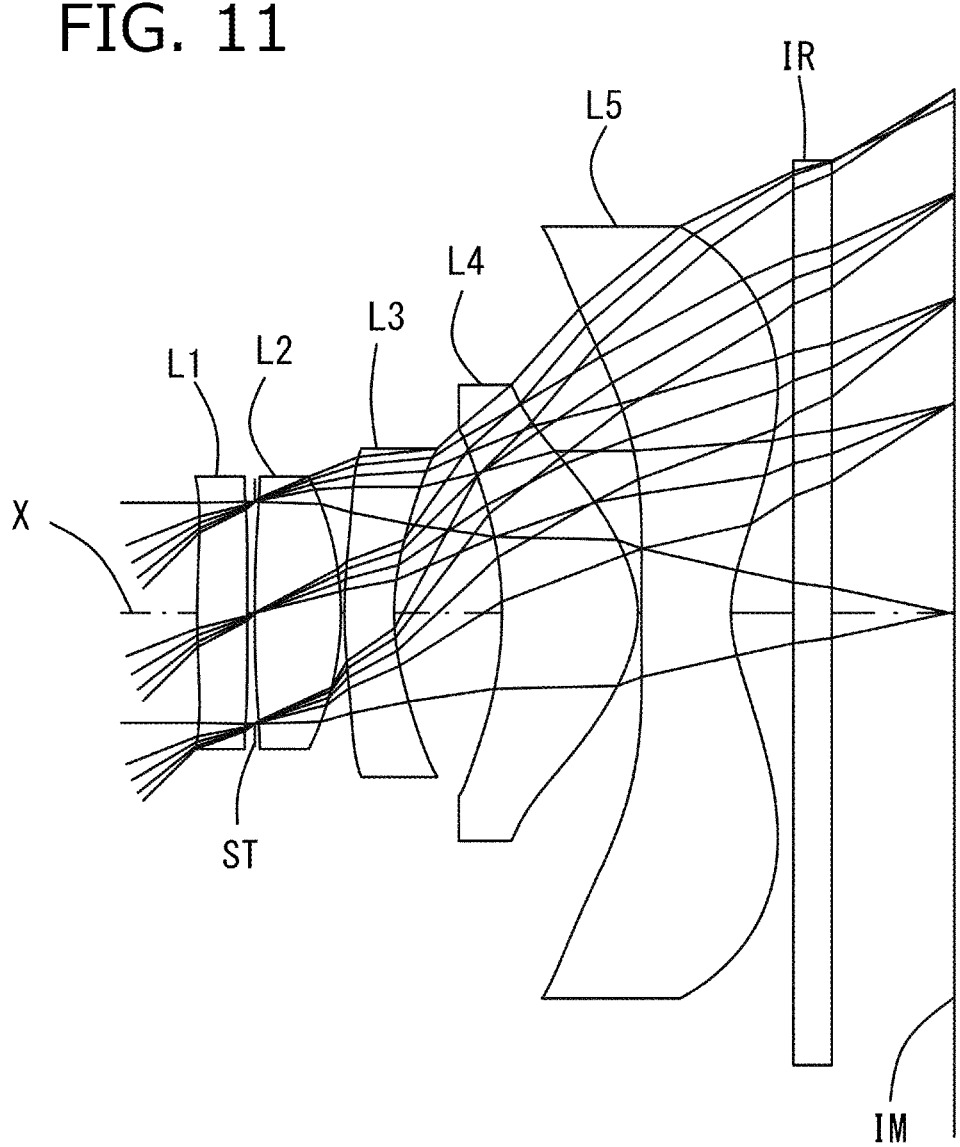
FIG. 11 is a schematic view showing the general configuration of an imaging lens according to Example 6 of the invention.

FIG. 10 shows spherical aberration (mm), astigmatism (mm), and distortion (%) of the imaging lens according to Example 5. As shown in FIG. 10, various aberrations are properly corrected.

The imaging lens provides a wide angle of view of about 90 degrees and high brightness with an F-value of about 2.4. Its total track length TTL is as short as 4.03 mm and the ratio of total track length TTL to maximum image height ih (TTL/2ih) is 0.71, which suggests that it offers a low-profile design though it includes five constituent lenses.

Example 6

The basic lens data of Example 6 is shown below in Table 6.

TABLE 6

Numerical Example 6 in mm
f = 2.871
Fno = 2.41
ω(°) = 44.66
ih = 2.855

| Surface No. i | Curvature Radius r | Surface Distance d | Refractive Index Nd | Abbe Number vd |
|---|---|---|---|---|
| (Object Surface) | Infinity | Infinity | | |
| 1* | 5.131 | 0.273 | 1.5438 | 55.57 |
| 2* | 100.000 | 0.041 | | |
| 3 (Stop) | Infinity | 0.000 | | |
| 4* | 13.276 | 0.469 | 1.5438 | 55.57 |
| 5* | −1.601 | 0.020 | | |
| 6* | 2.713 | 0.270 | 1.6355 | 23.91 |
| 7* | 1.259 | 0.588 | | |
| 8* | −2.082 | 0.740 | 1.5438 | 55.57 |
| 9* | −0.628 | 0.020 | | |
| 10* | 17.190 | 0.488 | 1.5346 | 56.16 |
| 11* | 0.722 | 0.340 | | |
| 12 | Infinity | 0.210 | 1.5168 | 64.20 |
| 13 | Infinity | 0.669 | | |
| Image Plane | Infinity | | | |

Constituent Lens Data

| Lens | Start Surface | Focal Length |
|---|---|---|
| 1 | 2 | 9.935 |
| 2 | 4 | 2.657 |
| 3 | 6 | −3.984 |
| 4 | 8 | 1.402 |
| 5 | 10 | −1.424 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | −1.745E+01 | 0.000E+00 |
| A4 | −1.533E−01 | −4.015E−02 | 1.596E−01 | −3.578E−01 | −2.385E−01 |
| A6 | −2.836E−01 | −1.224E−01 | −2.737E−01 | 5.088E−01 | −3.484E−02 |
| A8 | 8.403E−01 | 1.107E−02 | −1.224E−03 | −7.370E−01 | 4.098E−01 |
| A10 | −1.321E+00 | −3.210E−02 | 6.646E−02 | 5.241E−01 | −1.774E−01 |
| A12 | 6.982E−01 | 0.000E+00 | 0.000E+00 | 0.000E+00 | 0.000E+00 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | −5.270E+00 | 2.960E+00 | −4.101E+00 | 0.000E+00 | −6.381E+00 |
| A4 | −6.580E−02 | 5.735E−02 | −4.928E−01 | −1.352E−01 | −1.275E−01 |
| A6 | 1.068E−01 | −1.147E−01 | 9.303E−01 | 3.919E−02 | 7.851E−02 |
| A8 | −8.642E−02 | 3.960E−01 | −1.357E+00 | −3.698E−03 | −4.272E−02 |
| A10 | 1.431E−01 | −2.286E−01 | 1.207E+00 | 0.000E+00 | 1.507E−02 |
| A12 | −4.649E−02 | −1.334E−01 | −5.169E−01 | 0.000E+00 | −3.389E−03 |
| A14 | 0.000E+00 | 2.351E−01 | 8.216E−02 | 0.000E+00 | 4.401E−04 |
| A16 | 0.000E+00 | −7.454E−02 | 0.000E+00 | 0.000E+00 | −2.536E−05 |

As shown in Table 9, the imaging lens according to Example 6 satisfies all the conditional expressions (1) to (8).

Figure 12:
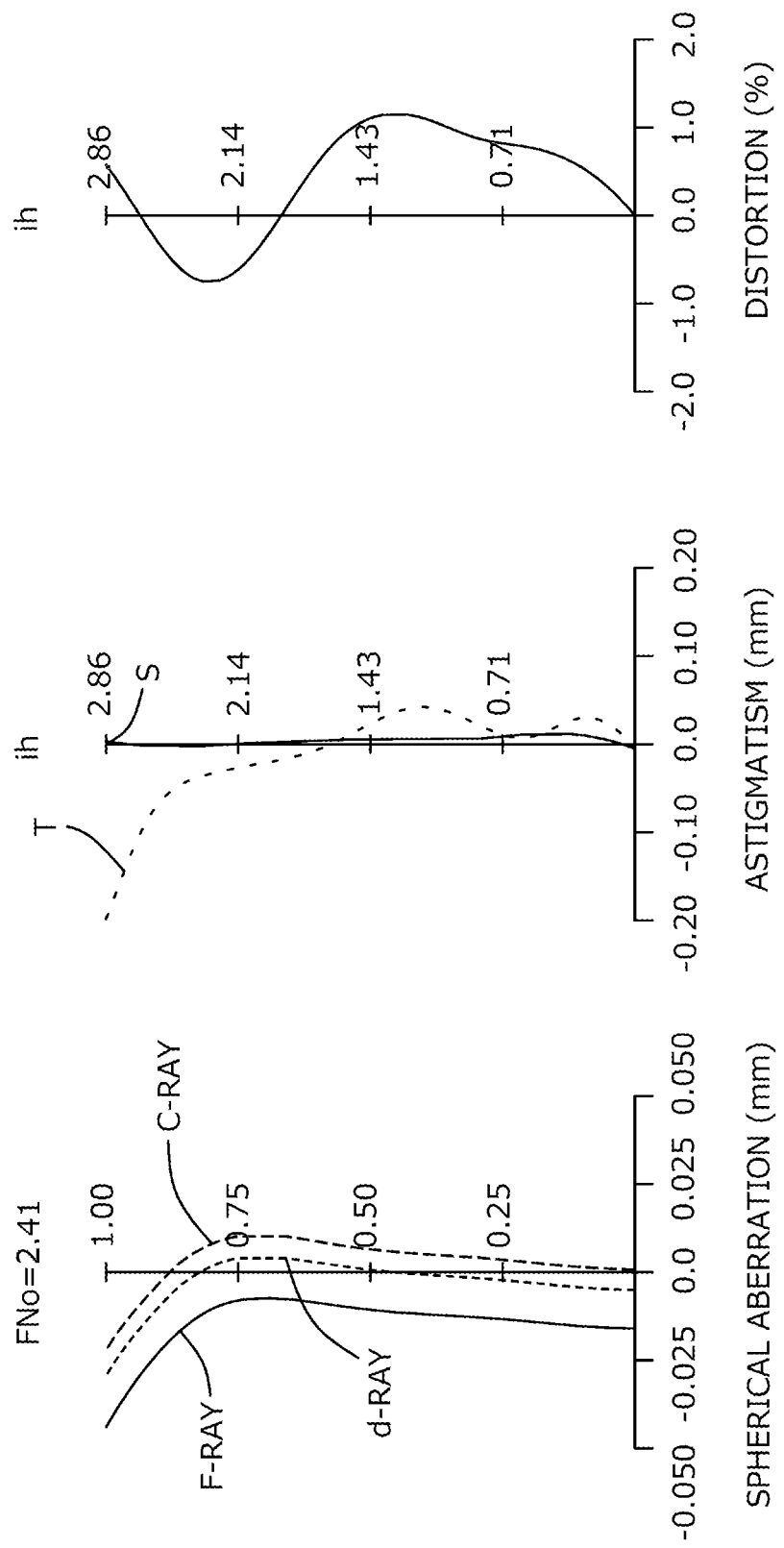
FIG. 12 shows spherical aberration, astigmatism, and distortion of the imaging lens according to Example 6.
Figure 13:
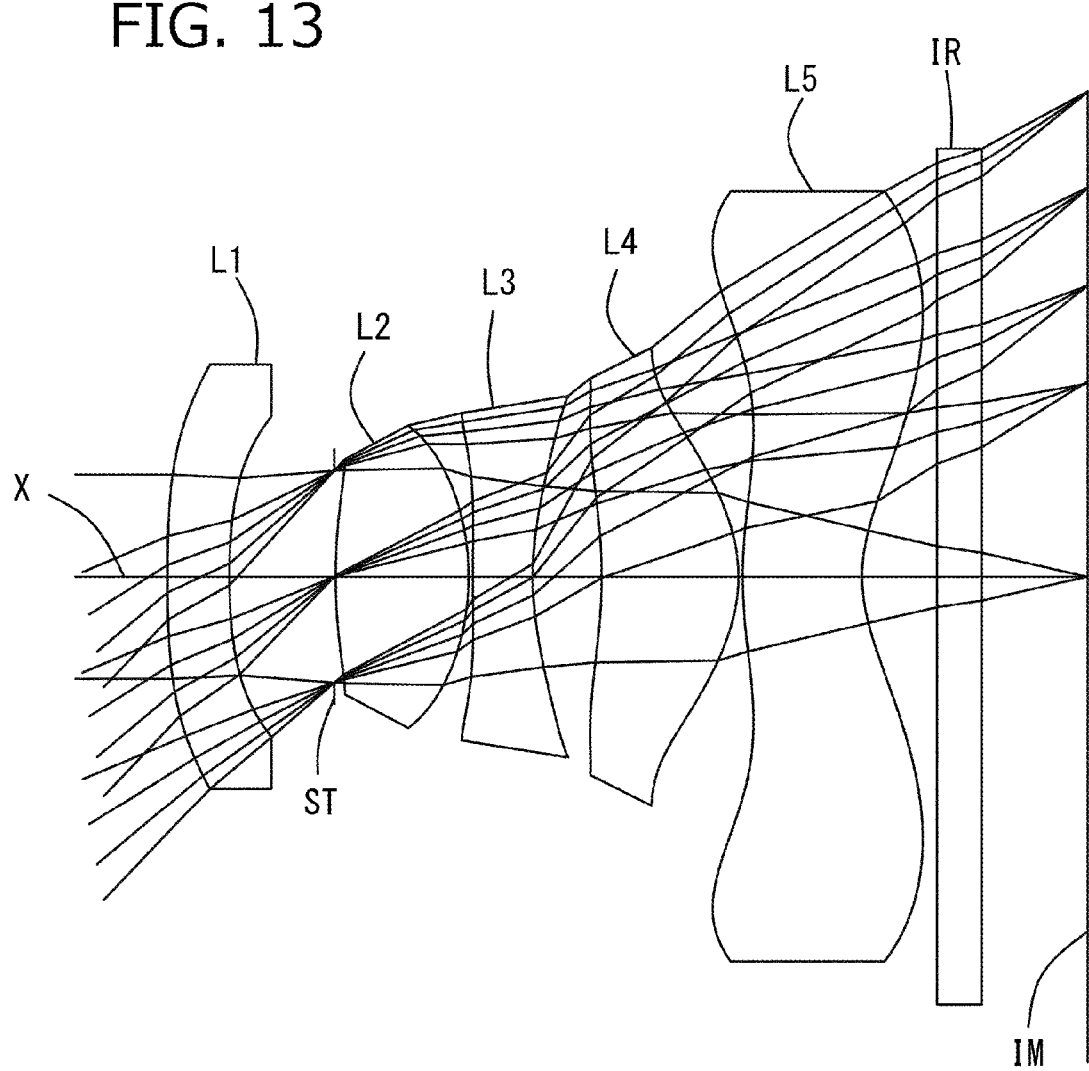
FIG. 13 is a schematic view showing the general configuration of an imaging lens according to Example 7 of the invention.

FIG. 12 shows spherical aberration (mm), astigmatism (mm), and distortion (%) of the imaging lens according to Example 6. As shown in FIG. 12, various aberrations are properly corrected.

The imaging lens provides a wide angle of view of about 90 degrees and high brightness with an F-value of about 2.4. Its total track length TTL is as short as 4.05 mm and the ratio of total track length TTL to maximum image height ih (TTL/2ih) is 0.71, which suggests that it offers a low-profile design though it includes five constituent lenses.

Example 7

The basic lens data of Example 7 is shown below in Table 7.

TABLE 7

Numerical Example 7 in mm
f = 2.136
Fno = 2.24
ω(°) = 46.49
ih = 2.268

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 7.845 | 0.290 | 1.5346 | 56.16 |
| 2* | 3.161 | 0.490 | | |
| 3 (Stop) | Infinity | 0.006 | | |
| 4* | 2.517 | 0.622 | 1.5438 | 55.57 |
| 5* | −1.203 | 0.020 | | |
| 6* | 11.939 | 0.280 | 1.6355 | 23.91 |
| 7* | 1.500 | 0.322 | | |
| 8* | −2.142 | 0.639 | 1.5438 | 55.57 |
| 9* | −0.738 | 0.020 | | |
| 10* | 2.084 | 0.557 | 1.5346 | 56.16 |
| 11* | 0.715 | 0.350 | | |
| 12 | Infinity | 0.210 | 1.5168 | 64.20 |
| 13 | Infinity | 0.496 | | |
| Image Plane | Infinity | | | |

Constituent Lens Data

| Lens | Start Surface | Focal Length |
|---|---|---|
| 1 | 2 | −10.119 |
| 2 | 4 | 1.591 |
| 3 | 6 | −2.728 |
| 4 | 8 | 1.785 |
| 5 | 10 | −2.370 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | −1.896E+00 | 0.000E+00 |
| A4 | 2.153E−01 | 3.690E−01 | −2.674E−02 | −1.217E−01 | −3.708E−01 |
| A6 | −1.224E−01 | −1.490E−01 | −3.232E−01 | −6.414E−01 | −8.363E−02 |
| A8 | 1.016E−01 | 2.971E−01 | 4.383E−02 | 1.392E+00 | 7.030E−01 |
| A10 | −6.824E−02 | −2.492E−01 | −2.060E+00 | −2.037E+00 | −1.582E−01 |
| A12 | 1.276E−02 | 0.000E+00 | 0.000E+00 | 0.000E+00 | −2.901E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 1.119E−01 | −4.630E+00 | −5.218E+00 | 0.000E+00 | −4.532E+00 |
| A4 | −3.367E−01 | 3.138E−01 | −7.355E−01 | −3.464E−01 | −1.702E−01 |
| A6 | 2.500E−01 | −4.593E−01 | 2.093E+00 | 1.110E−01 | 1.143E−01 |
| A8 | −1.598E−01 | 8.032E−01 | −4.131E+00 | −1.116E−02 | −6.929E−02 |
| A10 | 8.114E−02 | −4.453E−01 | 5.217E+00 | 0.000E+00 | 2.949E−02 |
| A12 | 6.357E−02 | −7.692E−01 | −3.290E+00 | 0.000E+00 | −7.973E−03 |
| A14 | 0.000E+00 | 1.211E+00 | 7.893E−01 | 0.000E+00 | 1.190E−03 |
| A16 | 0.000E+00 | −5.302E−01 | 0.000E+00 | 0.000E+00 | −7.428E−05 |

As shown in Table 9, the imaging lens according to Example 7 satisfies all the conditional expressions (1) to (8).

Figure 14:
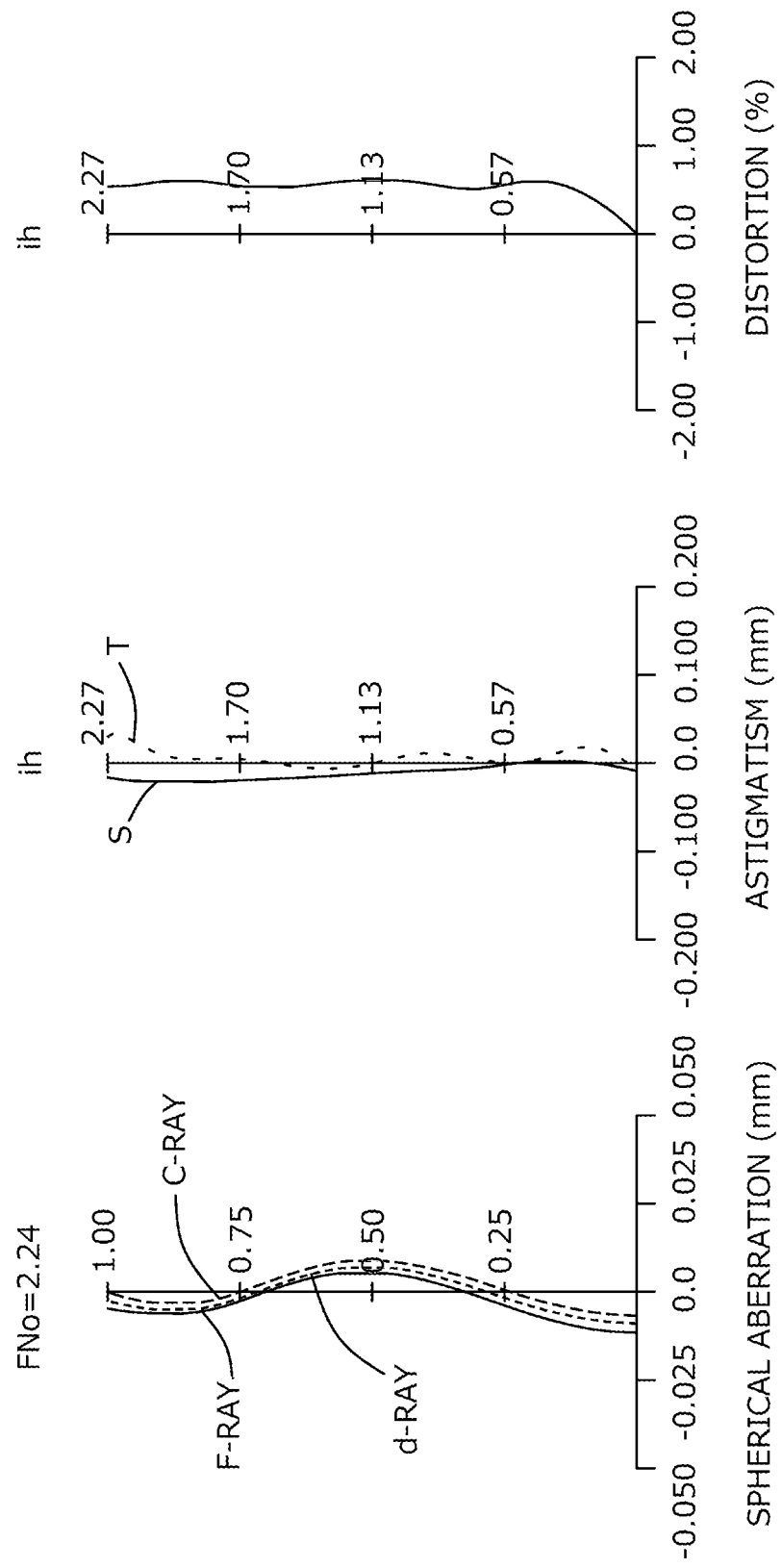
FIG. 14 shows spherical aberration, astigmatism, and distortion of the imaging lens according to Example 7.
Figure 15:
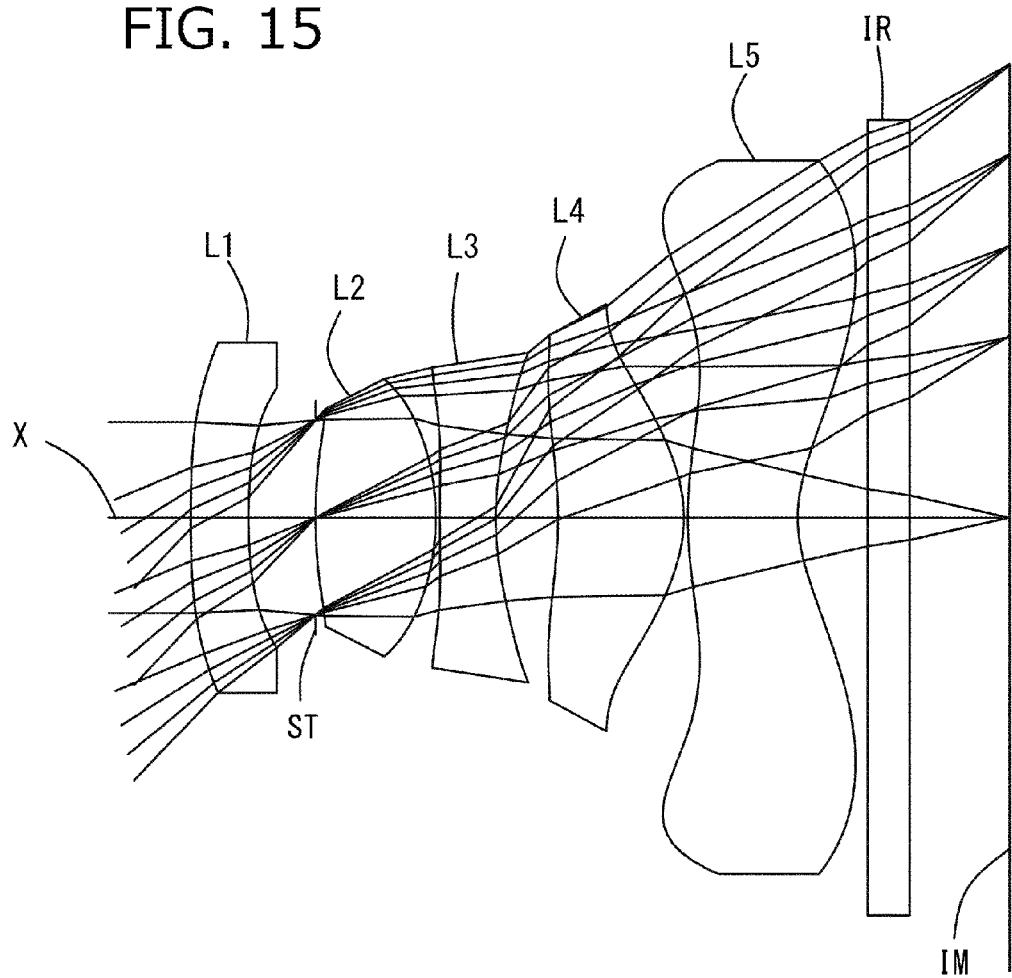
FIG. 15 is a schematic view showing the general configuration of an imaging lens according to Example 8 of the invention.

FIG. 14 shows spherical aberration (mm), astigmatism (mm), and distortion (%) of the imaging lens according to Example 7. As shown in FIG. 14, various aberrations are properly corrected.

The imaging lens provides a wide angle of view of about 93 degrees and high brightness with an F-value of about 2.2. Its total track length TTL is as short as 4.22 mm and the ratio of total track length TTL to maximum image height ih (TTL/2ih) is 0.93, which suggests that it offers a low-profile design though it includes five constituent lenses.

Example 8

The basic lens data of Example 8 is shown below in Table 8.

TABLE 8

Numerical Example 8 in mm
$f = 2.140$
$Fno = 2.24$
$\omega(°) = 46.48$
$ih = 2.268$ Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 7.444 | 0.290 | 1.5346 | 56.16 |
| 2* | 3.053 | 0.335 | | |
| 3 (Stop) | Infinity | 0.000 | | |
| 4* | 2.508 | 0.602 | 1.5438 | 55.57 |
| 5* | −1.232 | 0.020 | | |
| 6* | 9.867 | 0.280 | 1.6355 | 23.91 |
| 7* | 1.500 | 0.312 | | |
| 8* | −2.099 | 0.630 | 1.5438 | 55.57 |
| 9* | −0.735 | 0.020 | | |
| 10* | 2.000 | 0.551 | 1.5346 | 56.16 |
| 11* | 0.715 | 0.350 | | |
| 12 | Infinity | 0.210 | 1.5168 | 64.20 |
| 13 | Infinity | 0.501 | | |
| Image Plane | Infinity | | | |

Constituent Lens Data

| Lens | Start Surface | Focal Length |
|---|---|---|
| 1 | 2 | −9.909 |
| 2 | 4 | 1.611 |
| 3 | 6 | −2.820 |
| 4 | 8 | 1.788 |
| 5 | 10 | −2.444 |

Aspheric Surface Data

| | 1st Surface | 2nd Surface | 4th Surface | 5th Surface | 6th Surface |
|---|---|---|---|---|---|
| k | 0.000E+00 | 0.000E+00 | 0.000E+00 | −2.022E+00 | 0.000E+00 |
| A4 | 2.146E−01 | 4.050E−01 | 2.945E−02 | −1.104E−01 | −3.635E−01 |
| A6 | −1.094E−01 | 3.600E−02 | −2.839E−01 | −5.980E−01 | −2.162E−02 |
| A8 | 6.550E−02 | −2.628E−01 | −2.886E−01 | 1.302E+00 | 6.492E−01 |
| A10 | −7.743E−02 | 2.782E−01 | −1.225E+00 | −2.011E+00 | −1.834E−01 |
| A12 | 2.392E−02 | 0.000E+00 | 0.000E+00 | 0.000E+00 | −3.345E−02 |
| A14 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 |

| | 7th Surface | 8th Surface | 9th Surface | 10th Surface | 11th Surface |
|---|---|---|---|---|---|
| k | 1.478E−01 | −7.959E+00 | −5.432E+00 | 0.000E+00 | −4.652E+00 |
| A4 | −3.383E−01 | 3.286E−01 | −7.071E−01 | −3.133E−01 | −1.508E−01 |
| A6 | 2.628E−01 | −4.818E−01 | 2.088E+00 | 6.852E−02 | 9.757E−02 |
| A8 | −1.722E−01 | 7.691E−01 | −4.148E+00 | 1.208E−04 | −6.362E−02 |
| A10 | 8.022E−02 | −4.113E−01 | 5.221E+00 | 0.000E+00 | 2.940E−02 |
| A12 | 8.675E−02 | −7.373E−01 | −3.286E+00 | 0.000E+00 | −8.536E−03 |
| A14 | 0.000E+00 | 1.209E+00 | 7.873E−01 | 0.000E+00 | 1.346E−03 |
| A16 | 0.000E+00 | −5.659E−01 | 0.000E+00 | 0.000E+00 | −8.727E−05 |

As shown in Table 9, the imaging lens according to Example 8 satisfies all the conditional expressions (1) to (8).

Figure 16:
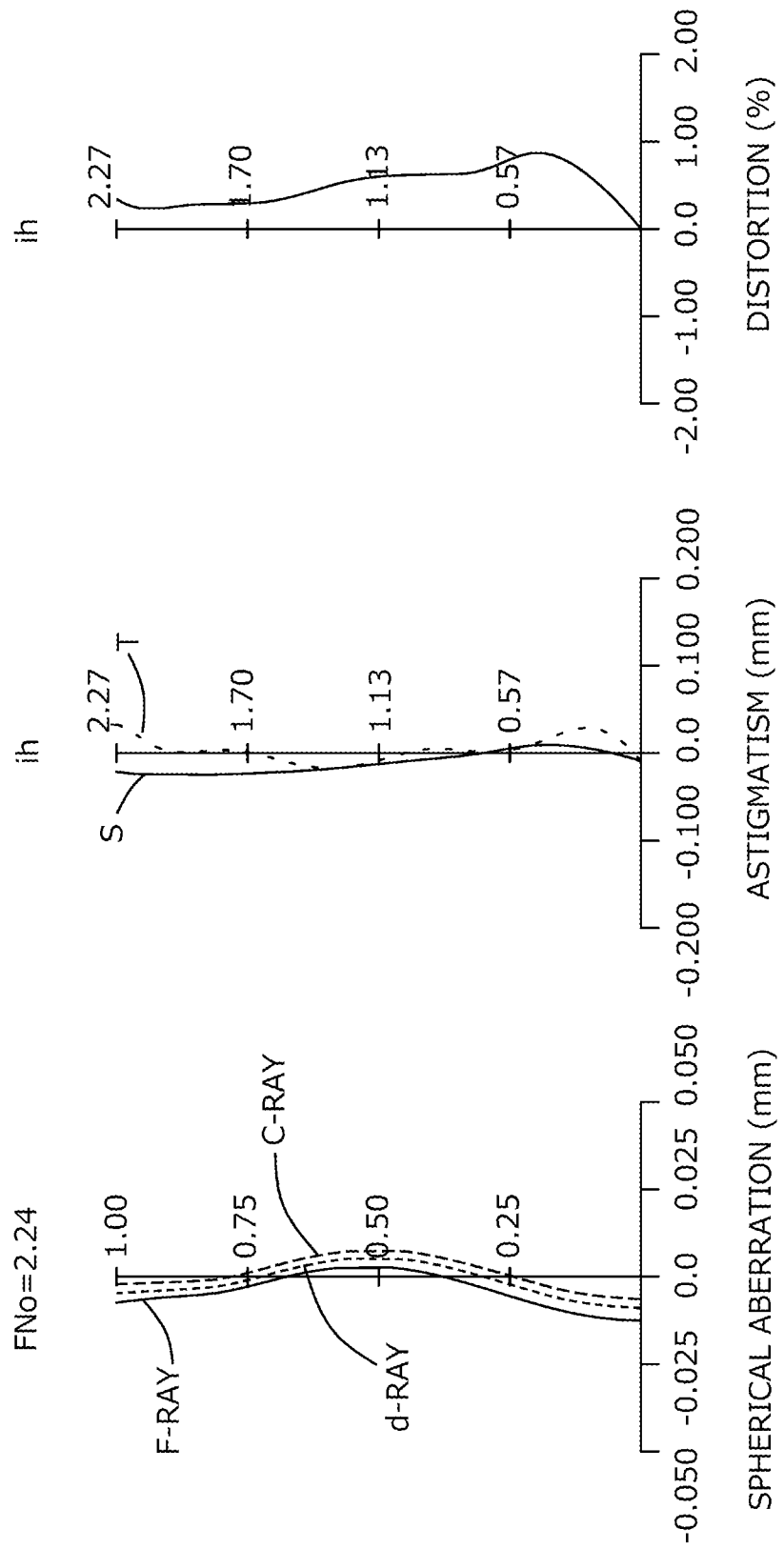
FIG. 16 shows spherical aberration, astigmatism, and distortion of the imaging lens according to Example 8.

FIG. 16 shows spherical aberration (mm), astigmatism (mm), and distortion (%) of the imaging lens according to Example 8. As shown in FIG. 16, various aberrations are properly corrected.

The imaging lens provides a wide angle of view of about 93 degrees and high brightness with an F-value of about 2.2. Its total track length TTL is as short as 4.02 mm and the ratio of total track length TTL to maximum image height ih (TTL/2ih) is 0.89, which suggests that it offers a low-profile design though it includes five constituent lenses.

As explained so far, the imaging lenses according to the preferred embodiments of the present invention realize an optical system which provides a wide angle of view from about 90 degrees to 93 degrees and has an ability to correct aberrations properly. In addition, the ratio of total track length TTL to maximum image height ih (TTL/2ih) is not more than 0.8 to 1.0, offering a low-profile design. Also they provide high brightness with an F-value of 2.2 to 2.4 or so.

Table 9 shows data on Examples 1 to 8 relating to the conditional expressions (1) to (8).

TABLE 9

| | Example 1 | Example 2 | Example 3 | Example 4 | Example 5 | Example 6 | Example 7 | Example 8 |
|---|---|---|---|---|---|---|---|---|
| Conditional Expression (1) 0.9 < ih/f < 1.1 | 1.00 | 1.00 | 1.00 | 1.00 | 1.00 | 0.99 | 1.06 | 1.06 |
| Conditional Expression (2) 0.04 < \|r1/r2\| < 2.50 | 0.93 | 0.98 | 1.08 | 0.14 | 0.04 | 0.05 | 2.48 | 2.44 |
| Conditional Expression (3) 0.4 < r6/f < 0.8 | 0.44 | 0.48 | 0.50 | 0.45 | 0.45 | 0.44 | 0.70 | 0.70 |
| Conditional Expression (4) 1.94 < \|r7/r8\| < 3.65 | 2.15 | 2.56 | 2.40 | 3.01 | 2.98 | 3.32 | 2.90 | 2.86 |
| Conditional Expression (5) 1.33 < TTL/f < 2.20 | 1.48 | 1.48 | 1.58 | 1.41 | 1.41 | 1.41 | 1.98 | 1.88 |
| Conditional Expression (6) 0.65 < f2/f < 1.24 | 0.71 | 0.87 | 0.74 | 1.13 | 1.03 | 0.93 | 0.74 | 0.75 |
| Conditional Expression (7) 1.0 < \|r3\|/f | 1.56 | 3.38 | 1.19 | 31.48 | 8.38 | 4.62 | 1.18 | 1.17 |
| Conditional Expression (8) −1.6 < f3\|/f < −1.0 | −1.17 | −1.29 | −1.18 | −1.42 | −1.39 | −1.39 | −1.28 | −1.32 |

When the imaging lens composed of five lenses according to any of the aforementioned embodiments is used for an optical system built in an image pickup device mounted in an increasingly compact and low-profile mobile terminal such as a smart phone, mobile phone or PDA (Personal Digital Assistant), or a game console or information terminal such as a PC, it realizes a wide-angle high-performance camera.

The effects of the present invention are as follows.

According to the present invention, it is possible to provide a low-cost, compact and low-profile imaging lens with relatively high brightness, which provides a wide angle of view and corrects various aberrations properly.

What is claimed is:

1. An imaging lens for a solid-state image sensor in which elements are arranged in order from an object side to an image side, comprising:
a first lens as a double-sided aspheric lens with positive refractive power having convex surfaces on the object side and the image side near an optical axis;
an aperture stop;
a second lens with positive refractive power having convex surfaces on the object side and the image side near the optical axis;
a third lens as a meniscus lens with negative refractive power having a concave surface on the image side;
a fourth lens with positive refractive power having a convex surface on the image side; and
a fifth lens as a meniscus lens with negative refractive power having a concave surface on the image side near the optical axis,
wherein an angle of view is substantially 90 degrees, and wherein a conditional expression (1) below is satisfied:

$$0.9 < ih/f < 1.1 \quad (1)$$

where
f: focal length of an overall optical system of the imaging lens, and
ih: maximum image height.

2. The imaging lens according to claim 1, wherein a conditional expression (2) below is satisfied:

$$0.04 < |r1/r2| < 2.50 \quad (2)$$

where
r1: curvature radius of the object-side surface of the first lens
r2: curvature radius of the image-side surface of the first lens.

3. The imaging lens according to claim 1, wherein a conditional expression (3) below is satisfied:

$$0.4 < r6/f < 0.8 \quad (3)$$

where
r6: curvature radius of the image-side surface of the third lens.

4. The imaging lens according to claim 1, wherein a conditional expression (4) below is satisfied:

$$1.94 < |r7/r8| < 3.65 \quad (4)$$

where
r7: curvature radius of the object-side surface of the fourth lens
r8: curvature radius of the image-side surface of the fourth lens.

5. The imaging lens according to claim 1, wherein a conditional expression (5) below is satisfied:

$$1.33 < TTL/f < 2.20 \quad (5)$$

where
TTL: distance on the optical axis from the object-side surface of the first lens to an image plane without a filter, etc.

6. The imaging lens according to claim 1, wherein a conditional expression (6) below is satisfied:

$$0.65 < f2/f < 1.24 \quad (6)$$

where
f2: focal length of the second lens.

7. The imaging lens according to claim 2, wherein a conditional expression (7) below is satisfied:

$$1.0<|r3|/f \qquad (7)$$

where
r3: curvature radius of the object-side surface of the second lens.

8. The imaging lens according to claim 1, wherein a conditional expression (8) below is satisfied:

$$-1.6<f3/f<-1.0 \qquad (8)$$

where
f3: focal length of the third lens.

9. The imaging lens according to claim 2, wherein a conditional expression (3) below is satisfied:

$$0.4<r6/f<0.8 \qquad (3)$$

where
r6: curvature radius of the image-side surface of the third lens.

10. The imaging lens according to claim 2, wherein a conditional expression (4) below is satisfied:

$$1.94<|r7/r8|<3.65 \qquad (4)$$

where
r7: curvature radius of the object-side surface of the fourth lens
r8: curvature radius of the image-side surface of the fourth lens.

11. The imaging lens according to claim 2, wherein a conditional expression (6) below is satisfied:

$$0.65<f2/f<1.24 \qquad (6)$$

where
f2: focal length of the second lens.

12. The imaging lens according to claim 2, wherein a conditional expression (8) below is satisfied:

$$-1.6<f3/f<-1.0 \qquad (8)$$

where
f3: focal length of the third lens.

13. An imaging lens for a solid-state image sensor in which elements are arranged in order from an object side to an image side, comprising:
a first lens as a meniscus double-sided aspheric lens with positive or negative refractive power having a convex surface on the object side near an optical axis;
an aperture stop;
a second lens with positive refractive power having a convex surface on the image side;
a third lens having a convex surface on the object side;
a fourth lens; and
a fifth lens as a meniscus lens with negative refractive power having a concave surface on the image side near the optical axis,
wherein conditional expressions (4) and (6) below are satisfied:

$$1.94<|r7/r8|<3.65 \qquad (4)$$

$$0.65<f2/f<1.24 \qquad (6)$$

where
r7: curvature radius of the object-side surface of the fourth lens,
r8: curvature radius of the image-side surface of the fourth lens,
f: focal length of an overall optical system of the imaging lens, and
f2: focal length of the second lens.

14. The imaging lens according to claim 13, wherein the third lens is a meniscus lens with negative refractive power, and the fourth lens with positive refractive power having a convex surface on the image side.

15. The imaging lens according to claim 13, wherein a conditional expression (1) below is satisfied:

$$0.9<ih/f<1.1 \qquad (1)$$

where
f: focal length of an overall optical system of the imaging lens, and
ih: maximum image height.

16. The imaging lens according to claim 13, wherein a conditional expression (2) below is satisfied:

$$0.04<|r1/r2|<2.50 \qquad (2)$$

where
r1: curvature radius of the object-side surface of the first lens, and
r2: curvature radius of the image-side surface of the first lens.

17. The imaging lens according to claim 13, wherein a conditional expression (3) below is satisfied:

$$0.4<r6/f<0.8 \qquad (3)$$

where
r6: curvature radius of the image-side surface of the third lens.

18. The imaging lens according to claim 13, wherein a conditional expression (5) below is satisfied:

$$1.33<TTL/f<2.20 \qquad (5)$$

where
TTL: distance on the optical axis from the object-side surface of the first lens to an image plane without a filter, etc.

19. The imaging lens according to claim 16, wherein a conditional expression (7) below is satisfied:

$$1.0<|r3|/f \qquad (7)$$

where
r3: curvature radius of the object-side surface of the second lens.

20. The imaging lens according to claim 13, wherein a conditional expression (8) below is satisfied:

$$-1.6<f3/f<-1.0 \qquad (8)$$

where
f3: focal length of the third lens.

* * * * *